US012783362B2

(12) United States Patent
Wang et al.

(10) Patent No.: US 12,783,362 B2
(45) Date of Patent: Nov. 3, 2026

(54) RESTORATION OF A COMPUTING SESSION

(71) Applicant: Google LLC, Mountain View, CA (US)

(72) Inventors: Xin Wang, Belmont, CA (US); Shihui Song, Lafayette, CO (US); Aga Wronska, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/595,015

(22) Filed: Mar. 4, 2024

(65) Prior Publication Data

US 2024/0211356 A1 Jun. 27, 2024

Related U.S. Application Data

(63) Continuation of application No. 16/947,131, filed on Jul. 20, 2020, now Pat. No. 11,921,592.

(51) Int. Cl.
*G06F 11/00* (2006.01)
*G06F 8/61* (2018.01)
(Continued)

(52) U.S. Cl.
CPC ............ *G06F 11/1469* (2013.01); *G06F 8/61* (2013.01); *G06F 9/452* (2018.02); (Continued)

(58) Field of Classification Search
CPC ........ G06F 11/1469; G06F 9/452; G06F 8/61; G06F 11/1451; G06F 2201/82; H04L 67/306
See application file for complete search history.

(56) References Cited

U.S. PATENT DOCUMENTS 7,386,855 B2 * 6/2008 Song ........................ H04L 67/14 719/310
7,532,196 B2 * 5/2009 Hinckley ................ G06F 3/011 345/156
(Continued)

FOREIGN PATENT DOCUMENTS

CN 104935613 A 9/2015
CN 105593816 A 5/2016
(Continued)

OTHER PUBLICATIONS

International Search Report and Written Opinion for PCT Application No. PCT/US2021/070892, mailed on Oct. 29, 2021, 14 pages.

*Primary Examiner* — Loan L. T. Truong
(74) *Attorney, Agent, or Firm* — BRAKE HUGHES BELLERMANN LLP

(57) ABSTRACT

According to an aspect, a method of restoring a computing session includes receiving, over a network, session data from a server computer, where the session data includes information about at least one session item that is active during a computing session of a first computing device. The at least one session item includes at least one of a web application or a native application. The method includes restoring the at least one session item of the computing session on a second computing device based on the session data, where the at least one session item is arranged on a user interface of the second computing device according to a display arrangement that corresponds to a display arrangement of the at least one session item on a user interface of the first computing device.

22 Claims, 19 Drawing Sheets

(51) Int. Cl.

| | |
|---|---|
| ***G06F 9/451*** | (2018.01) |
| ***G06F 11/1446*** | (2026.01) |
| ***G09G 5/14*** | (2006.01) |
| ***H04L 67/306*** | (2022.01) |

(52) U.S. Cl.
CPC ........... *G06F 11/1451* (2013.01); *G09G 5/14* (2013.01); *H04L 67/306* (2013.01); *G06F 2201/82* (2013.01)

(56) References Cited

U.S. PATENT DOCUMENTS

| | | | | |
|---|---|---|---|---|
| 8,468,388 | B2 | 6/2013 | Bhogal et al. | |
| 8,543,935 | B2 * | 9/2013 | Duffy | G06F 3/0484 715/779 |
| 8,850,351 | B2 | 9/2014 | Beharie et al. | |
| 9,164,646 | B2 * | 10/2015 | Cheng | G09G 3/003 |
| 9,219,762 | B2 * | 12/2015 | Burch | H04L 65/1066 |
| 9,369,284 | B2 | 6/2016 | Elton et al. | |
| 10,051,019 | B1 | 8/2018 | Jasso et al. | |
| 10,386,994 | B2 | 8/2019 | Singal et al. | |
| 10,511,674 | B2 * | 12/2019 | Xiao | G06F 9/452 |
| 10,516,743 | B1 | 12/2019 | Qin et al. | |
| 10,686,646 | B1 * | 6/2020 | Suryanarayanan | H04L 67/131 |
| 10,938,915 | B1 | 3/2021 | Schwesinger et al. | |
| 10,999,362 | B1 | 5/2021 | Kudrin et al. | |
| 11,036,344 | B1 | 6/2021 | Portelli et al. | |
| 11,068,136 | B1 * | 7/2021 | Koushik | G06F 3/0482 |
| 11,070,630 | B2 | 7/2021 | Van Rotterdam et al. | |
| 11,159,627 | B1 * | 10/2021 | Pachkov | H04L 61/50 |
| 11,159,646 | B1 * | 10/2021 | Singh | H04L 67/01 |
| 11,196,819 | B2 | 12/2021 | Morgan | |
| 11,386,769 | B2 | 7/2022 | Adler et al. | |
| 2001/0037399 | A1 | 11/2001 | Eylon et al. | |
| 2002/0175933 | A1 * | 11/2002 | Ronkainen | G06F 3/167 715/727 |
| 2003/0132928 | A1 * | 7/2003 | Kori | H04M 1/0245 345/204 |
| 2003/0179240 | A1 * | 9/2003 | Gest | G06F 3/0481 715/779 |
| 2004/0044721 | A1 | 3/2004 | Song et al. | |
| 2004/0199784 | A1 | 10/2004 | Irisawa et al. | |
| 2005/0283757 | A1 * | 12/2005 | Fleming | G06F 9/451 717/113 |
| 2006/0048062 | A1 * | 3/2006 | Adamson | G09G 5/363 715/810 |
| 2006/0075106 | A1 | 4/2006 | Hochmuth et al. | |
| 2006/0136835 | A1 * | 6/2006 | Hochmuth | G09G 5/14 715/779 |
| 2009/0083655 | A1 | 3/2009 | Beharie et al. | |
| 2009/0315973 | A1 | 12/2009 | Izotov et al. | |
| 2010/0121959 | A1 * | 5/2010 | Lin | H04L 67/025 709/228 |
| 2011/0246904 | A1 * | 10/2011 | Pinto | G06F 9/452 715/740 |
| 2012/0310889 | A1 | 12/2012 | Mcneil et al. | |
| 2014/0032706 | A1 | 1/2014 | Kuscher et al. | |
| 2014/0047360 | A1 | 2/2014 | Kay et al. | |
| 2014/0188977 | A1 | 7/2014 | Song et al. | |
| 2014/0281897 | A1 * | 9/2014 | Goodger | G06F 9/4856 715/234 |
| 2014/0282213 | A1 | 9/2014 | Musa et al. | |
| 2014/0282217 | A1 | 9/2014 | Musa et al. | |
| 2016/0173617 | A1 | 6/2016 | Allinson | |
| 2017/0078748 | A1 | 3/2017 | Ashkan et al. | |
| 2017/0249069 | A1 * | 8/2017 | Zamir | G06F 9/461 |
| 2018/0113586 | A1 | 4/2018 | Arar et al. | |
| 2018/0300217 | A1 | 10/2018 | Doggett et al. | |
| 2019/0197991 | A1 | 6/2019 | Zamir | |
| 2019/0310882 | A1 | 10/2019 | Wei et al. | |
| 2019/0339843 | A1 | 11/2019 | Yost | |
| 2020/0143333 | A1 | 5/2020 | Gonzalez et al. | |
| 2020/0236102 | A1 | 7/2020 | Azulay et al. | |
| 2020/0272304 | A1 * | 8/2020 | Yost | G06F 21/53 |
| 2020/0272484 | A1 | 8/2020 | Kunene et al. | |
| 2020/0319784 | A1 * | 10/2020 | Sinclair | G06T 11/001 |
| 2020/0394063 | A1 | 12/2020 | Kelly | |
| 2020/0394234 | A1 | 12/2020 | Chikkala et al. | |
| 2020/0401428 | A1 | 12/2020 | Soman et al. | |
| 2021/0097596 | A1 * | 4/2021 | Gaber | G06Q 30/0631 |
| 2021/0099868 | A1 | 4/2021 | Damlaj et al. | |
| 2021/0141497 | A1 | 5/2021 | Magureanu et al. | |
| 2021/0149700 | A1 | 5/2021 | Soman | |
| 2021/0232319 | A1 | 7/2021 | Reddy A V et al. | |
| 2021/0271577 | A1 * | 9/2021 | Patil | G06F 11/1662 |
| 2021/0334118 | A1 | 10/2021 | Liu et al. | |
| 2021/0366430 | A1 * | 11/2021 | Miller | G09G 5/12 |
| 2022/0131943 | A1 | 4/2022 | Zhang et al. | |
| 2022/0222097 | A1 | 7/2022 | Lokesharadhya et al. | |

FOREIGN PATENT DOCUMENTS

| | | | |
|---|---|---|---|
| CN | 105630628 | A | 6/2016 |
| CN | 110727382 | A | 1/2020 |
| CN | 111031108 | A | 4/2020 |
| WO | 2005015882 | A1 | 2/2005 |
| WO | 2018073649 | A1 | 4/2018 |

* cited by examiner

RESTORATION OF A COMPUTING SESSION

CROSS-REFERENCE TO RELATED APPLICATION

This application is a continuation of, and claims priority to, U.S. patent application Ser. No. 16/947,131, filed on Jul. 20, 2020, entitled "RESTORATION OF A COMPUTING SESSION", the disclosure of which is incorporated by reference herein in its entirety.

BACKGROUND

Users often use multiple devices to complete tasks. For example, a user may use one device at school, and then use another device at home. In some examples, a user may use multiple devices at work. The user may have opened and positioned several different applications on the user interface of a first computing device. Then, the user may switch to a second computing device. In order to continue with the same tasks, the user may have to launch the same applications and position them in a manner that was used on the first computing device. In addition, if the user is carrying out one or more tasks with the first computing device and the first computing device crashes, the user may have to reopen and position the applications in the same/similar manner as they were before the computer crashed.

SUMMARY

According to an aspect, a method of restoring a computing session includes receiving, over a network, session data from a server computer, where the session data includes information about at least one session item that is active during a computing session of a first computing device. The at least one session item includes at least one of a web application or a native application. The method includes restoring the at least one session item of the computing session on a second computing device based on the session data, where the at least one session item is arranged on a user interface of the second computing device according to a display arrangement that corresponds to a display arrangement of the at least one session item on a user interface of the first computing device.

According to an aspect, the method includes one or more of the following features (or any combination thereof). The session data includes information about a plurality of session items, where the plurality of session items are restored on the second computing device according to a predefined order. The predefined order may be based on the type of session item, the type of computing device, or the times in which the session items were last active on the first computing device. The method may include determining that the native application is not installed on the second computing device, installing the native application on the second computing device, and launching the native application on the second computing device. The method may include transmitting, over the network, an indication that a user account of the user is accessed on the second computing device, and receiving, over the network, the session data from the server computer in response to the indication. The method may include arranging the web application at a first window position on the user interface of the second computing device, and displaying the native application at a second window position on the user interface of the second computing device. The first window position corresponds to a window position in which the web application was arranged on the first computing device, and the second window position corresponds to a window position in which the native application was arranged on the first computing device. The at least one session item also includes a browser application, where the browser application is configured to render one or more browser tabs in a context of a browser window. The at least one session item also includes a display state of the user interface of the first computing device. The display state includes at least one of a split screen feature, a picture-in-picture, or a full screen mode. The at least one session item also includes one or more virtual desks. The session data includes information about which session item was launched during the computing session, window position of each session item, and window size of each session item.

According to an aspect, a non-transitory computer-readable medium storing executable instructions that when executed by at least one processor are configured to cause the at least one processor to receive, over a network, session data from a first computing device, where the session data includes information about at least one session item that is active (e.g., used by a user) during a computing session and the at least one session item includes a web application or a native application. The non-transitory computer-readable medium stores instructions that causes the at least one processor to store the session data with respect to a user account associated with the user, receive, over the network, an indication that the user account is accessed from a second computing device, and transmit, over the network, the session data to the second computing device to restore the at least one session item on the second computing device. The session data is used to arrange the at least one session item on a user interface of the second computing device according to a display arrangement that corresponds to a display arrangement of the at least one session item on a user interface of the first computing device. The native application is a program executable by an operating system of the first computing device or the second computing device, where the web application is a program executable by a web server and delivered through a browser interface of a browser application. The at least one session item also includes a browser application, where the browser application is configured to render one or more browser tabs in a context of a browser window. The at least one session item also includes a display state of the user interface of the first computing device, the display state including a split screen feature. The at least one session item also includes a first virtual desk and a second virtual desk, where the first virtual desk is associated with a first set of session items, and the second virtual is associated with a second set of session items. The session data includes information about which session item was launched during the computing session, window position of each session item, and window size of each session item.

According to an aspect, a method of restoring a computing session includes detecting a crash event during a computing session on a computing device, obtaining session data from a memory device in response to the crash event, where the session data includes information about at least one session item that is active during the computing session and the at least one session item including a web application or a native application, and restoring the at least one session item of the computing session on the computing device based on the session data. The at least one session item is arranged on a user interface according to a display arrangement that corresponds to a display arrangement of the at least one session item that existed before the detection of the crash event. The native application is a program executable by an operating system of the computing device, wherein the web application is a program executable by a web server and delivered through a browser interface of a browser application. The session data includes information about a plurality of session items, where the plurality of session items includes a first application and a second application. The plurality of session items are restored on the computing device according to an order based on type of application such that the second application is restored before the first application. The at least one session item also includes a browser application, the browser application configured to render one or more browser tabs in a context of a browser window, the at least one session item also includes a display state of the user interface of the computing device, the at least one session item also includes one or more virtual desks.

The details of one or more implementations are set forth in the accompanying drawings and the description below. Other features will be apparent from the description and drawings, and from the claims.

DETAILED DESCRIPTION

Figure 1A:
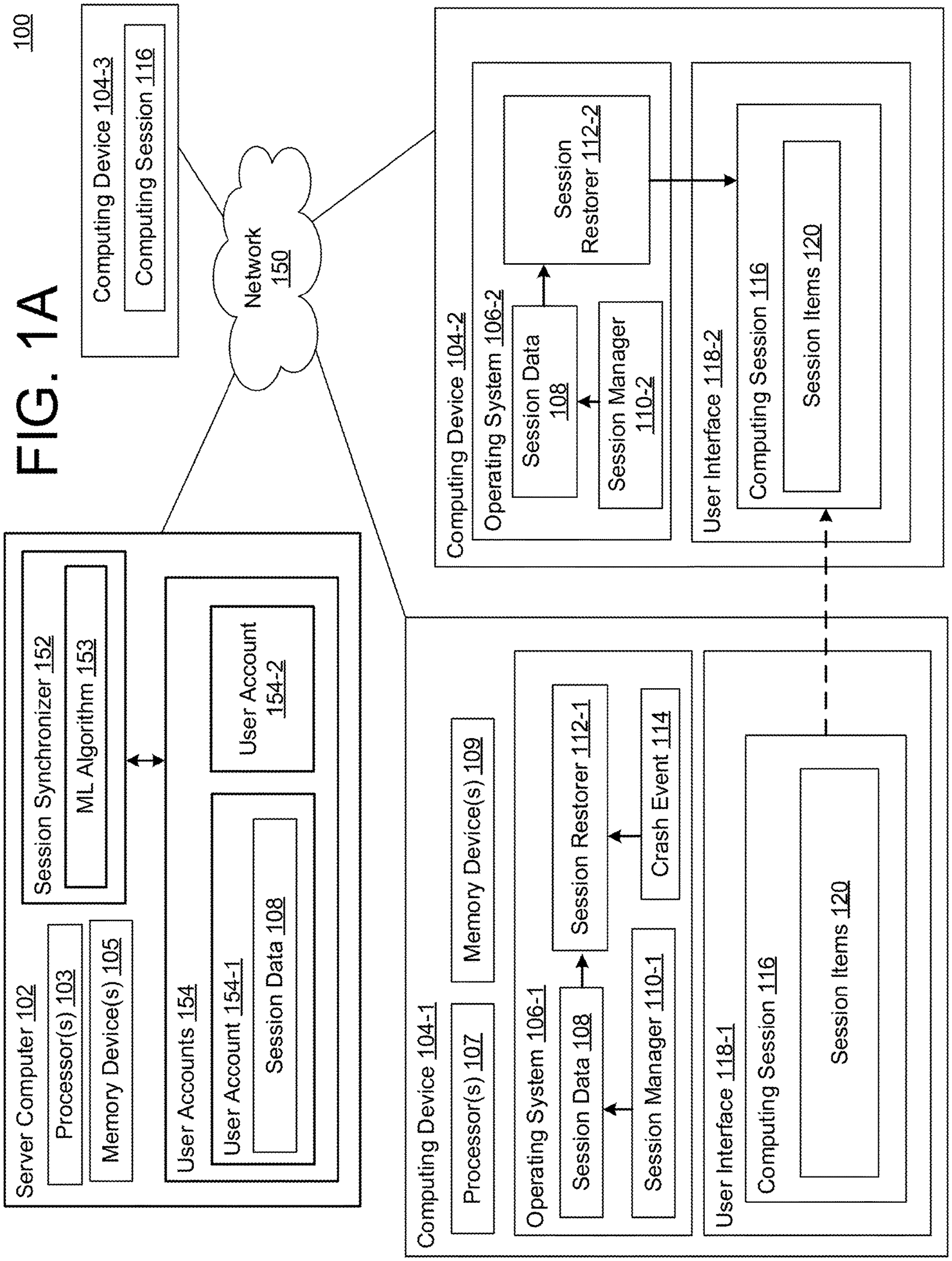
FIG. 1A illustrates a system for restoring one or more session items of a computing session according to an aspect.

This disclosure relates to the restoration of a computing session in response to a crash event and/or the synchronization of a computing session from one computing device to another computing device. For example, this disclosure relates to the seamless synchronization of a computing session from one device to another device or during a crash event. In some examples, the session items (or a subset of the session items) (e.g., browser tabs/windows, web applications, native applications, display states, virtual desks, etc.) can be automatically restored, thereby minimizing the time needed to restore the computing session.

In further detail, a user may access a user account on a first computing device, which may include providing a username/password or other type of authentication credential. A login screen may be displayed to permit the user to supply the user's credentials, which, when authenticated, allows the user to access the functionalities of the first computing device. The computing session may start in response to the user account being determined as accessed or when the user interface of the first computing device is displayed.

During the computing session (and if authorized by the user), session data is generated. The session data includes information about session items used/enabled by the user during the computing session. The session items may include browser tabs/windows, applications (e.g., web applications, native applications), virtual desks, display states (or modes) (e.g., split screen, picture-in-picture, full screen mode, etc.), and/or other graphical control elements (e.g., files, windows, control screens, etc.). For example, during the computing session, a user may launch and manipulate browser tabs/windows and applications on the user interface of the first computing device. In some examples, the user may enable or configure one or more virtual desks and/or enable a split screen on the first computing device. In some examples, the user may enter a full screen mode, and/or establish a picture-in-picture on the first computer's interface. In some examples, the user may open one or more files or windows or other types of graphical control elements.

As the user launches, enables, and/or manipulates these session items on the user interface, session data is generated. The session data may include an identification of which session item has been launched, configured, or enabled, window positions, window sizes, whether a session item is positioned in the foreground or background, whether a session item is focused or non-focused, the time in which the session items was used (or last used), and/or a recency or last appearance order of the session items. In some examples, the session data may include session item assignment to virtual desk and/or physical display and/or application navigation state (e.g., activity stack or other identification of a screen that the application was displaying).

In some examples, the session data is stored within a memory device on the first computing device. In some examples, the session data may be transmitted, over a network, to a server computer in which the session data is stored in association with the user account of the user at the server computer. For example, as the user launches and/or manipulates a session item on the user interface, session data about the session items are transmitted to the server computer.

The user may log out of the user account on the first computing device with the session items still displayed (or enabled) on the first computing device. In some examples, the user does not log out of the user account but leaves the first computing device with the session items still displayed (or enabled) on the user interface. In either case, the user may access the user account on a second computing device, which may include providing a username/password or other type of authentication credential.

In response to the user account being accessed from the second computing device, the session data may be received from the server computer to restore the computing session on the second computing device. In some examples, after logging in, the full computing session is automatically restored (e.g. all the applications, display states or modes, virtual desks, etc. are restored). The session data is configured to be used by the operating system of the second computing device to restore the session items on the second computing device. The session items may be restored on the second computing device's user interface in the same manner as they were displayed/enabled on the first computing device. For example, the session items from the previously logged device (e.g., the first computing device) may be synchronized (e.g., replicated or transferred) to the currently logged device (e.g., the second computing device) if the user has opted for session synchronization across multiple devices during the device startup.

In other words, the same computing session (e.g., the full computing session) that was created on the first computing device is restored on (or transferred to) the second computing device so that the user can continue with their tasks. In some examples, the session items are automatically launched/enabled on the second computing device (e.g., during startup). In some examples, a notification is rendered to ask the user whether the user would like the computing session restored, and/or a list of session items is rendered so that the user can select which ones to use on the second computing device.

In some examples, if a particular application identified by the session data is not installed or configured on the second computing device, the application may be automatically downloaded, installed, and launched in the same window position as the application was positioned on the first computing device. In some examples, if the application identified by the session data is not installed or configured on the second computing device, a notification may be rendered to ask the user whether the user would like to download and install the application.

The session items may be restored according to a predefined order. In some examples, the order is a recency or last appearance order (e.g., the last application used first). In some examples, focused applications are restored, which are then followed by non-focused applications. In some examples, the order is determined based on the type of session item. For example, browser tabs may be restored, which are then followed by non-browser applications (e.g., native applications). In some examples, the non-browser applications are restored in the background. In some examples, the order of restoration may be optimized for the performance of the device. In some examples, the restoration status of the session items waiting to be launched are displayed in a progress icon (e.g., loading spinner).

In some examples, one or more of the session items (e.g., applications) are determined as relevant (e.g., likely to be used by the user on the second computing device), and these relevant session items are automatically restored on the second computing device. For example, a machine learning algorithm may be executed to identify which of the session items are likely to be used on the second computing device. For the ones determined as likely to be used, these session items may be automatically restored. In some examples, the user may be notified of the unrestored session items, where the user can decide whether to restore the unrestored session items. In some examples, when more than one computing session is available (e.g., when the user is accessing (e.g., simultaneously accessing) two or more devices), the session manager may retain the latest session as a master session to restore or confirms with the user whether to resynchronize with a newer session.

In some examples, the computing session is restored in response to a crash event. For example, as the user launches and/or manipulates the session items on the user interface of the first computing device, session data is generated, and the session data may be stored within a memory device on the first computing device. In some examples, the session data is transmitted, over a network, to a server computer in which the session data is stored in association with the user account of the user at the server computer.

A crash event may be detected in which some or all of the session items are stopped or not displayed on the user interface of the first computing device. In response to the crash event (or upon startup), the session data may be obtained, e.g., either from the memory device on the first computing device or from the server computer. The session data may be used to restore the session items on the user interface of the first computing device according to any of the techniques described above with respect session synchronization across multiple devices.

Figure 1B:
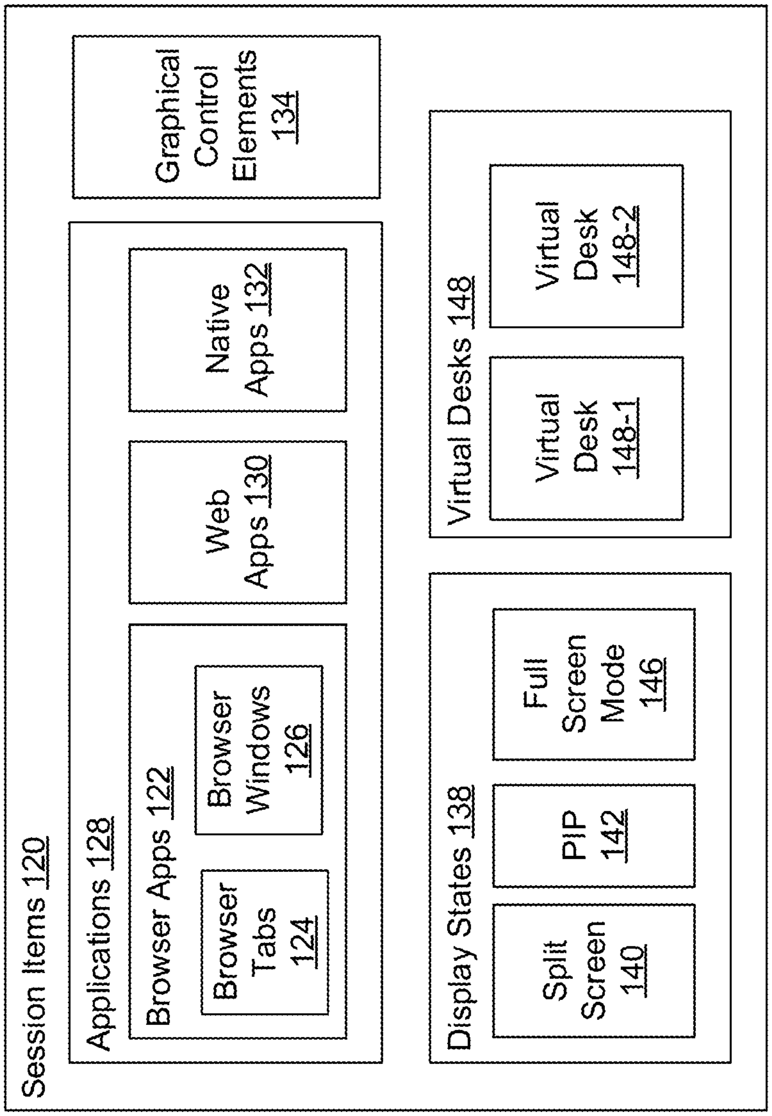
FIG. 1B illustrates examples of session items according to an aspect.

FIGS. 1A and 1B illustrate a system 100 for restoring a computing session 116 according to an aspect. In some examples, the computing session 116 can be restored in response to a crash event 114. In some examples, the computing session 116 can be synchronized across multiple devices (e.g., computing device 104-1, computing device 104-2).

The computing device 104-1 is a device having an operating system 106-1 that renders a user interface 118-1 (e.g., a graphical user interface (GUI)), which allows the user to interact with the functionalities of the computing device 104-1. In some examples, the computing device 104-1 includes a personal computer, a mobile phone, a tablet, or a laptop. The computing device 104-1 may include one or more processors 107 formed in a substrate configured to execute one or more machine executable instructions or pieces of software, firmware, or a combination thereof. The processors 107 can be semiconductor-based—that is, the processors can include semiconductor material that can perform digital logic. The computing device 104-1 may include one or more memory devices 109. The memory devices 109 may include a main memory that stores information in a format that can be read and/or executed by the processors 107. The memory devices 109 may store applications (e.g., operating system 106-1, applications 128, etc.) and modules (e.g., session manager 110-1, session restorer 112-1, etc.) that, when executed by the processors 107, perform certain operations.

The operating system 106-1 is a system software that manages computer hardware, software resources, and provides common services for computing programs. In some examples, the operating system 106-1 is operable to run on a personal computer such as a laptop or a desktop computer. In some examples, the operating system 106-1 is operable to run a mobile computer such as a smartphone or tablet. The operating system 106-1 may include a plurality of modules such as a session manager 110-1 and a session restorer 112-1, which are explained later in the disclosure.

In some examples, the computing device 104-1 may communicate with a server computer 102 over a network 150. In some examples, the server computer 102 stores user accounts 154 for users of the various computing devices of the system 100. In some examples, although not shown in FIG. 1A, the computing device 104-1 stores one or more user accounts 154 that pertain to the authorized users of the computing device 104-1. A user account 154 may store information pertaining to the user such as a profile of the user and/or information obtained through the user's use of the computing device 104-1 when authorized by the user.

For example, a user of the computing device 104-1 may be provided with controls allowing the user to make an election as to both if and when systems, programs, or features described herein may enable collection of user information (e.g., information about a user's activities, a user's preferences, or a user's current location), and whether the user is sent content or communications from the server computer 102. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user of the computing device 104-1 may have control over what information is collected about the user, how that information is used, and what information is provided to the user and/or to the server computer 102.

The server computer 102 may be computing devices that take the form of a number of different devices, for example a standard server, a group of such servers, or a rack server system. In some examples, the server computer 102 may be a single system sharing components such as processors and memories. The network 150 may include the Internet and/or other types of data networks, such as a local area network (LAN), a wide area network (WAN), a cellular network, satellite network, or other types of data networks. The network 150 may also include any number of computing devices (e.g., computer, servers, routers, network switches, etc.) that are configured to receive and/or transmit data within network 150. Network 150 may further include any number of hardwired and/or wireless connections.

The server computer 102 may include one or more processors 103 formed in a substrate, an operating system (not shown) and one or more memory devices 105. The memory devices 105 may represent any kind of (or multiple kinds of) memory (e.g., RAM, flash, cache, disk, tape, etc.). In some examples (not shown), the memory devices 105 may include external storage, e.g., memory physically remote from but accessible by the server computer 102. The server computer 102 may include one or more modules or engines representing specially programmed software. For example, the server computer 102 may include a session synchronizer 152 that enables the computing session 116 to be synced across multiple devices such as computing device 104-1 and computing device 104-2.

The computing device 104-2 is a device having an operating system 106-2 that renders a user interface 118-2 (e.g., a graphical user interface (GUI)), which allows the user to interact with the functionalities of the computing device 104-2. In some examples, the computing device 104-2 includes any of the features discussed with respect to the computing device 104-1. For example, the computing device 104-2 may include an operating system 106-2, a session manager 110-2, a session restorer 112-2, and a user interface 118-2. Also, although not shown in FIG. 1A, the computing device 104-2 may include one or more processors (e.g., processors 107) and one or more memory devices (e.g., memory devices 109). In some examples, the computing device 104-2 includes a personal computer, a mobile phone, a tablet, or a laptop. In some examples, the computing device 104-2 is the same type of device as computing device 104-1 (e.g., both are laptops, tablets, smartphones, etc.). In some examples, the computing device 104-1 and the computing device 104-2 are different types of devices (e.g., one is a laptop, the other one is a tablet, etc.). In some examples, the operating system 106-2 is the same type of operating system as the operating system 106-1.

A user may access a user account 154-1 on the computing device 104-1, which may include providing a username/password or other type of authentication credential. Successful access to the user account 154-1 may provide access to the functionalities of the computing device 104-1. The user account 154-1 may be one of the user accounts 154, which pertains to the user of the computing device 104-1. In some examples, the user may be associated with another user account, e.g., user account 154-2. For example, the user may be associated with a primary account (e.g., user account 154-1) and a secondary account (e.g., user account 154-1), where access to either of the primary account or the secondary account provides access to the computing device 104-1. In some examples, the user account 154-1 and the user account 154-2 pertains to different users. For example, user A may provide her authentication credential, which, when authorized, provides access to the computing device 104-1. User B may provide her authentication credential, which, when authorized, provides access to the computing device 104-1. In some examples, the computing device 104-1 displays a login screen to permit the user to supply the user's credential, which, when authenticated, allows the user to access the functionalities of the computing device 104-1. In some examples, a computing session 116 starts in response to the user account 154-1 (or, some examples, user account 154-2) being determined as accessed or when the user interface 118-1 is initially displayed. In some examples, the computing session 116 may be referred to as an operating system (OS) session.

During the computing session 116, the operating system 106-1 (e.g., the session manager 110-1) generates session data 108. The session data 108 includes information about session items 120 used by the user during the computing session 116. The session items 120 may include programs, controls, and/or settings used by the user during the computing session 116. Referring to FIG. 1B, the session items 120 may include applications 128, display states 138, virtual desks 148, and/or graphical control elements 134. The graphical control elements 134 may include user interface elements pertaining to other types of programs or controls such as files, windows, and/or control screens.

An application 128 may be any type of computer program that can be executed/delivered by the computing device 104-1. An application 128 may provide a user interface (e.g., application window) on the user interface 118-1 to allow the user to interact with the functionalities of a respective application 128. The application window of a particular application 128 may display application data along with any type of controls such as menu(s), icons, widgets, etc.

The applications 128 may include browser applications 122. A browser application 122 is a web browser configured to access information on the Internet. The browser application 122 may launch one or more browser tabs 124 in the context of one or more browser windows 126 on the user interface 118-1. The applications 128 may include web applications 130. A web application 130 may be an application program that is stored on a remote server (e.g., a web server) and delivered over the network 150 through the browser tab 124. In some examples, the web application 130 is a progressive web application, which can be saved on the device and used offline. The application 128 may include non-web applications, which may be programs that are at least partially stored (e.g., stored locally) on the computing device 104-1. In some examples, non-web applications may be executable by (or running on top of) the operating system 106-1.

The applications 128 may include native applications 132. A native application 132 is a software program that is developed for use on a particular platform or device. In some examples, the native application 132 is a software program that is developed for multiple platforms or devices. In some examples, the native application 132 is a software program developed for use on a mobile platform and also configured to execute on a desktop or laptop computer. In some examples, the native applications 132 include Android Runtime for Chrome (ARC) applications. In some examples, the native applications 132 include Linux applications (or sometimes referred to as Crostini applications).

The display states 138 may include any type of state or mode relating to the user interface display. In some examples, the display states 138 include a split screen feature 140. When the split screen feature 140 is enabled, the user interface 118-1 is vertically or horizontally split, thereby allowing the user to view two applications 128 side-by-side or view multiple sections of the same document or multiple files at once. In some examples, the display states 138 include a picture-in-picture feature 142. The picture-in-picture feature 142 is a program that permits a video to be displayed in the foreground while the user can and interact with other applications 128. In some examples, the picture-in-picture feature 142 is a popped out, always-on-top video player that floats on top of other windows. In some examples, the display states 138 include full screen mode 146. Full screen mode 146 permits a particular program to occupy the entire screen of the user interface 118-1 (or substantially the entire screen of the user interface 118-1). In some examples, the full screen mode 146 includes a maximized mode in which the window takes the entire screen that is not occupied by the system UI. In some examples, the full screen mode 146 includes the entire screen in which the window takes the entire screen including the space previously occupied by the system UI. In some examples, the display states 138 include multiple physical displays. For example, a device may be associated with a first display screen and a second display screen (or more than two display screens).

The virtual desks 148 may be considered virtual desktops, workspaces, or desktop objects and are used to expand the size of the desktop on the user interface 118-1 or used to group (application) windows. A user may create a virtual desk 148-1, which allows the user to open and manipulate various applications 128, graphical control elements 134, and display states 138. For example, with respect to the virtual desk 148-1, the user may enable a split screen feature 140, launch a web application 130 on one part of the user interface 118-1, and launch a native application 132 on the other part of the user interface 118-1. Then, the user may create a virtual desk 148-2 to open and display one or more browser tabs 124 to execute one or more personal tasks such as planning a trip. A user may be able to switch between the virtual desk 148-1 and the virtual desk 148-2.

A computing session 116 may start in response to the user account 154-1 (or, some examples, user account 154-2) being determined as accessed. During the computing session 116, a user may launch and manipulate browser tabs 124 and/or browser windows 126 on the user interface 118-1. In some examples, the user may launch a web application 130, and a native application 132, which displays application windows on the user interface 118-1. In some examples, the user may set up one or more virtual desks 148 and/or enable a split screen feature 140 on the computing device 104-1. In some examples, the user may enter a full screen mode 146, and/or establish a picture-in-picture feature 142 on the user interface 118-1. In some examples, the user may open and position one or more graphical control elements 134 on the user interface 118-1.

As the user launches and/or manipulates the session items 120 on the user interface 118-1, the session manager 110-1 generates session data 108 about the session items 120. The session data 108 may include an identification of which session item 120 has been launched (e.g., started), window positions (and window sizes) of the applications 128 and/or graphical control elements 134 on the user interface 118-1, whether an application 128 is positioned in the foreground or background, whether an application 128 is focused or non-focused, the time in which the session items 120 were used (or last used), and/or a recency or last appearance order of the session items 120. In some examples, the session data 108 may include session item assignment to virtual desk 148 and/or physical display (in multi-display setup). For example, the session data 108 may identify which application 128 (or generally which session item 120) is assigned to which virtual desk 148. Also, the session data 108 may identify which application 128 (or generally which session item 120) is displayed on which physical display (if a multi-display setup is used). In some examples, the session data 108 may include application navigation state (e.g., activity stack or other identification of a screen that the application 128 was displaying). For example, with respect to a particular application 128, the session data 108 may include information about the underlying navigation state, e.g., identification of a screen that the application 128 was displaying.

In some examples, the session manager 110-1 stores the session data 108 within the memory device 109. In some examples, the session manager 110-1 transmits the session data 108, over the network 150, to the server computer 102 (e.g., to the session synchronizer 152) in which the session data 108 is stored in association with the user account 154-1 (or the user account 154-2) of the user at the server computer 102. For example, as the user establishes a session item 120 on the user interface 118-1, the session manager 110-1 transmits session data 108 about the session item 120 to the server computer 102. At the server computer 102, the session synchronizer 152 stores the session data 108 at the user account 154-1.

In some examples, the user logs out of the user account 154-1 (or the user account 154-2) on the computing device 104-1 with the session items 120 still active on the user interface 118-1. A session item 120 that is active may refer to a session item 120 that is not closed (or terminated). For example, an application 128, opened by the user, that is running in the background or foreground may be considered a session item 120 that is active. A split screen feature 140 that is enabled may be considered a session item 120 that is active. In some examples, the user does not log out of the user account 154-1 (or the user account 154-2) of the computing device 104-1 but leaves the computing device 104-1 with the session items 120 still active on the user interface 118.

In either case, the user may access the user account 154-1 on a computing device 104-2, which may include providing a username/password or other type of authentication credential. For example, the user may use a different computing device (e.g., computing device 104-2) to access the same user account (e.g., user account 154-1) that was used on the computing device 104-1. In some examples, the user creates the computing session 116 on the computing device 104-1 using the user account 154-1 but accesses the computing device 104-2 using the authentication credential of the user account 154-2.

In some examples, in response to the user account 154-1 being accessed from the computing device 104-2, the session manager 110-2 of the computing device 104-2 may receive the session data 108 from the session synchronizer 152 of the server computer 102 to restore the computing session 116 on the computing device 104-2. In some examples, when the user account 154-1 and the user account 154-2 belong to the same user (e.g., one is a primary account and the other is a secondary account), the session manager 110-2 may receive, in response to the user account 154-2 being accessed from the computing device 104-2, the session data 108 from the server computer 102 to restore the computing session 116 on the computing device 104-2.

In some examples, after logging in, the computing session 116 is automatically restored on the computing device 104-2. The session data 108 is configured to be used by the operating system 106-2 of the computing device 104-2 to restore the session items 120 on the user interface 118-2 of the computing device 104-2. If the session items 120 include one or more applications 128, the applications 128 are launched and displayed on the user interface 118-2 in substantially the same manner as they were displayed on the user interface 118-1. If the session items 120 include one or more display states 138, the display states 138 are enabled in substantially the same manner as they were enabled on the user interface 118-1. If the session items 120 include one or more virtual desks 148, the virtual desks 148 are created on the user interface 118-2 in substantially the same manner they were established on the user interface 118-1.

The session restorer 112-2 may receive the session data 108 from the session manager 110-2, and the session restorer 112-2 may restore the computing session 116 on the computing device 104-2. In some examples, the session restorer 112-2 restores the session items 120 on the user interface 118-2 in the same manner as they were displayed on the computing device 104-1. For example, based on the session data 108 received from the session synchronizer 152, the operating system 106-2 of the computing device 104-2 may synchronize the session items 120 from the previously logged device (e.g., the computing device 104-1) to the currently logged device (e.g., the computing device 104-2). In some examples, the operating system 106-2 of the computing device 104-2 synchronizes the session items 120 if the user has opted for session synchronization across multiple devices during the device startup.

On the computing device 104-1, the user may have opened one or more browser tabs 124 in separate browser windows 126, opened a web application 130, and a native application 132. Also, the user may have enabled a split screen feature 140 with one of the browser tabs 124 in the foreground on one part of the screen, and the web application 130 in the foreground on the other part of the screen. The native application 132 may be positioned in the background (or minimized). The session manager 110-2 may receive session data 108 about these session items 120 in response to the user logging into the computing device 104-2, where the session restorer 112-2 restores the same computing session 116 (e.g., the full session) that was established on the computing device 104-1. For example, the session restorer 112-2 may enable the split screen feature 140, launch the browser tab 124 in the foreground on one part of the screen, launch the web application 130 in the foreground on the other part of the screen, and position the native application 132 in the background.

In other words, the same computing session 116 that was created on the computing device 104-1 is restored on (or transferred to) the computing device 104-2 so that the user can continue with her tasks. In some examples, the session restorer 112-2 automatically restores the session items 120 identified by the session data 108. In some examples, the session restorer 112-2 renders a message asking whether the user would like the computing session 116 to be restored, and/or renders a list of the session items 120 that can be restored where the user can select which ones to use on the computing device 104-2. In some examples, the session restorer 112-2 may select some of the session items 120 identified by the session data 108 (or all of them) as recommendations to launch on the computing device 104-2.

In some examples, if a particular application 128 identified by the session data 108 is not installed or configured on the computing device 104-2, the session restorer 112-2 may automatically download and install the application 128 and launch the application 128 in the same window position as the application 128 was positioned on the computing device 104-1. In some examples, if the application 128 identified by the session data 108 is not installed or configured on the computing device 104-2, the session restorer 112-2 may render a notification to ask the user whether the user would like to download and install the application 128.

In some examples, the session restorer 112-2 enables the user to synchronize specific virtual desks 148 to restore, independently of each other. For example, if the session items 120 include a first virtual desk 148-1 and a second virtual desk 148-2. The session restorer 112-2 may render a notification asking whether the user would like to restore the first virtual desk 148-1 and/or the second virtual desk 148-2. In some examples, the session restorer 112-2 may automatically restore the first virtual desk 148-1 and the second virtual desk 148-2. In some examples, the session restorer 112-2 may automatically restore the first virtual desk 148-1 and then render a notification asking whether the user would like to restore the second virtual desk 148-1.

In some examples, the session restorer 112-2 restores all the session items 120 at once (e.g., initiates the launch and display of the session items 120 in parallel with each other). In some examples, the session restorer 112-2 restores the session items 120 in a sequential manner. For example, if the session data 108 indicates three items (e.g., one browser tab 124, one native application 132, one web application 130), the session restorer 112-2 may restore the items sequentially, e.g., initiate launch and display of the browser tab 124, followed by the web application 130, which is then followed by the native application 132.

In some examples, the session restorer 112-2 may restore the session items 120 identified by the session data 108 according to a predefined order. In some examples, the order is a recency or last appearance order. For example, the session data 108 may indicate the times in which the session items 120 were last active (e.g., last used). In some examples, the session restorer 112-2 restores the most recently used session items 120 first. The session restorer 112-2 may restore the last active session item 120 (e.g., the most recently used session item 120), followed by the second-to-last active session item 120 (e.g., the next recently used session item 120), and so forth. For example, if a web application 130 was last used by the user, the session restorer 112-2 may restore the web application 130 first, which is then followed by the next used session item 120 and so forth.

In some examples, the session restorer 112-2 may restore the session items 120 that are focused followed by session items 120 that are non-focused. A session item 120 that is focused indicates that the window of the application 128 is selected to receive input. For instance, text entered at the keyboard or pasted from a clipboard is sent to the component which has the focus. Moving the focus away from a specific user interface element is known as a blur event in relation to this element. Typically, the focus is withdrawn from an element by giving another element the focus.

In some examples, the order is determined based on the type of session item 120. For example, the order may be determined based on whether the application 128 is a browser application 122, a web application 130, or a native application 132. In some examples, browser tabs 124 and web applications 130 are restored first, which is then followed by native applications 132. For example, the session restorer 112-2 may restore (or synchronize) browser tabs 124 and then restore native applications 132 in the background.

In some examples, the order of restoration is based on the type of computing device and/or performance of the computing device 104-2. For example, when restoring to a low-performance device, the restoration may be sequential in order to prevent the device from freezing. If the low-performance device is not able to run all of the applications 128 at the same time, then the last used applications 128 may remain unrestored. In some examples, the session restorer 112-2 may display the restoration status of the applications 128 waiting to be launched in a progress icon (e.g., loading spinner).

In some examples, the session restorer 112-2 may automatically restore a subset of the session items 120, where the subset of session items 120 are the ones that are determined as relevant. For example, the session synchronizer 152 may execute a machine learning algorithm 153 to predict which of the session items 120 are likely to be used on the computing device 104-2. In some examples, the machine learning algorithm 153 is a neural network.

In response to the user logging into the computing device 104-2, the session synchronizer 152 may obtain the session data 108 from the user account 154-1 and use the session data 108 as one or more inputs (in conjunction with one or more other input signals) to the machine learning algorithm 153. The other input signals may include the time spent in each application 128, the amount of interaction with a particular application 128, etc. In some examples, the other input signals include timestamps for the application activity intervals (e.g., to discover patterns in times of day/week/month that the application is used in), device location data (e.g., to discover patterns between location or movement and application usage), device settings (e.g., Wi-Fi, tethering, volume, brightness, do not disturb mode, tablet mode) (e.g., to discover patterns between device state and application usage), and/or connected peripherals (e.g., keyboard, mouse, speakers, etc.).

The machine learning algorithm 153 may identify one or more of the session items 120 identified by the session data 108 as the ones likely to be used by the user on the computing device 104-2. Then, the session synchronizer 152 may transmit the session data 108 (along with the results of the machine learning algorithm 153) to the session manager 110-2. In some examples, the session restorer 112-2 includes the machine learning algorithm 153. For example, the session restorer 112-2 may receive the session data 108 from the session synchronizer 152, and the session restorer 112 may execute the machine learning algorithm 153 to predict which of the session items 120 are likely to be used on the computing device 104-2

For the ones determined as likely to be used, the session restorer 112-2 may automatically restore those session items 112-2. In some examples, the session restorer 112-2 may notify the user of unrestored session items 120, where the user can decide whether to restore the unrestored session items 120. In some examples, the session restorer 112-2 may render a notification that identifies the ones that have been selected by the machine learning algorithm 153 and then permits the user to select one of more of the relevant session items 120.

In some examples, multiple computing sessions 116 associated with a single user account may be occurring, and a newer session may become available. For example, the user may be switching between two devices, e.g., computing device 104-1 and computing device 104-2. For example, the user may use the computing device 104-1 to launch and display a browser window 126 with a series of browser tabs 124 on the user interface 118-1. Also, the user may use the computing device 104-1 to launch and display a native application 132 on the user interface 118-1. Then, the user may switch to the other computing device (e.g., computing device 104-2) and sync the computing session 116 on the computing device 104-2 according to the techniques explained above. Then, the user may further manipulate the restored browser window 126 or open new applications 128 on the computing device 104-2. Then, the user may switch back to the computing device 104-1. In some examples, the computing device 104-1 may render a notification informing the user that a new session is available. When the user selects the UI element indicating to restore the newer session, the computing device 104-1 may restore those session items 120 from the computing device 104-2.

In some examples, the user may log into the computing device 104-1 using the user account 154-1 to create a computing session 116 (referred to as a first computing session) and log into a computing device 104-3 using the user account 154-2 to create a computing session 116 (referred to as a second computing session). In some examples, the user account 154-1 and the user account 154-2 are different accounts belonging to the same user. In some examples, the user may be using the computing device 104-1 and the computing device 104-3 around the same time (or at different times), which results in the first computing session and the second computing session. These computing sessions 116 may be stored at the user account 154-1 and the user account 154-2 at the server computer 102. Then, in response to the user logging into the computing device 104-2, the session synchronizer 152 may transmit at least one of the first computing session or the second computing session to the computing device 104-2 to restore the first computing session or the second computing session on the computing device 104-2. In some examples, the computing device 104-3 restores the first computing session or the second computing session, whichever is the latest session. In some examples, the computing device 104-1 provides a notification that enables the user to select either the first computing session or the second computing session. In some examples, the computing device 104-1 provides a notification that enables the user to select individual session items 120 from the first computing session or individual session items 120 from the second computing session.

In some examples, the computing session 116 is restored in response to a crash event 114. For example, as the user launches, enables, or manipulates the session items 120 on the user interface 118-1, the session manager 110-1 generates session data 108 about the session items 120. In some examples, the session manager 110-1 stores the session data 108 within the memory device 109 on the computing device 104-1. In some examples, the session manager 110-1 transmits the session data 108, over the network 150, to the server computer 102 in which the session data 108 is stored in association with the user account 154-1 of the user at the server computer 102.

In some examples, the session manager 110-1 may detect a crash event 114 in which some or all of the session items 120 are stopped or not displayed on the user interface 118-1 of the computing device 104-1. In response to the crash event 114, the session manager 110-1 may obtain the session data 108, e.g., either from the memory device 109 on the computing device 104-1 or from the server computer 102. The session manager 110-1 may provide the session data 108 to the session restorer 112-1, where the session restorer 112-1 may use the session data 108 to restore the session items 120 on the user interface 118-1 of the computing device 104-1. The session restorer 112-1 may restore the session items 120 according to any of the techniques discussed above with respect to session synchronization across multiple devices.

Figure 2:
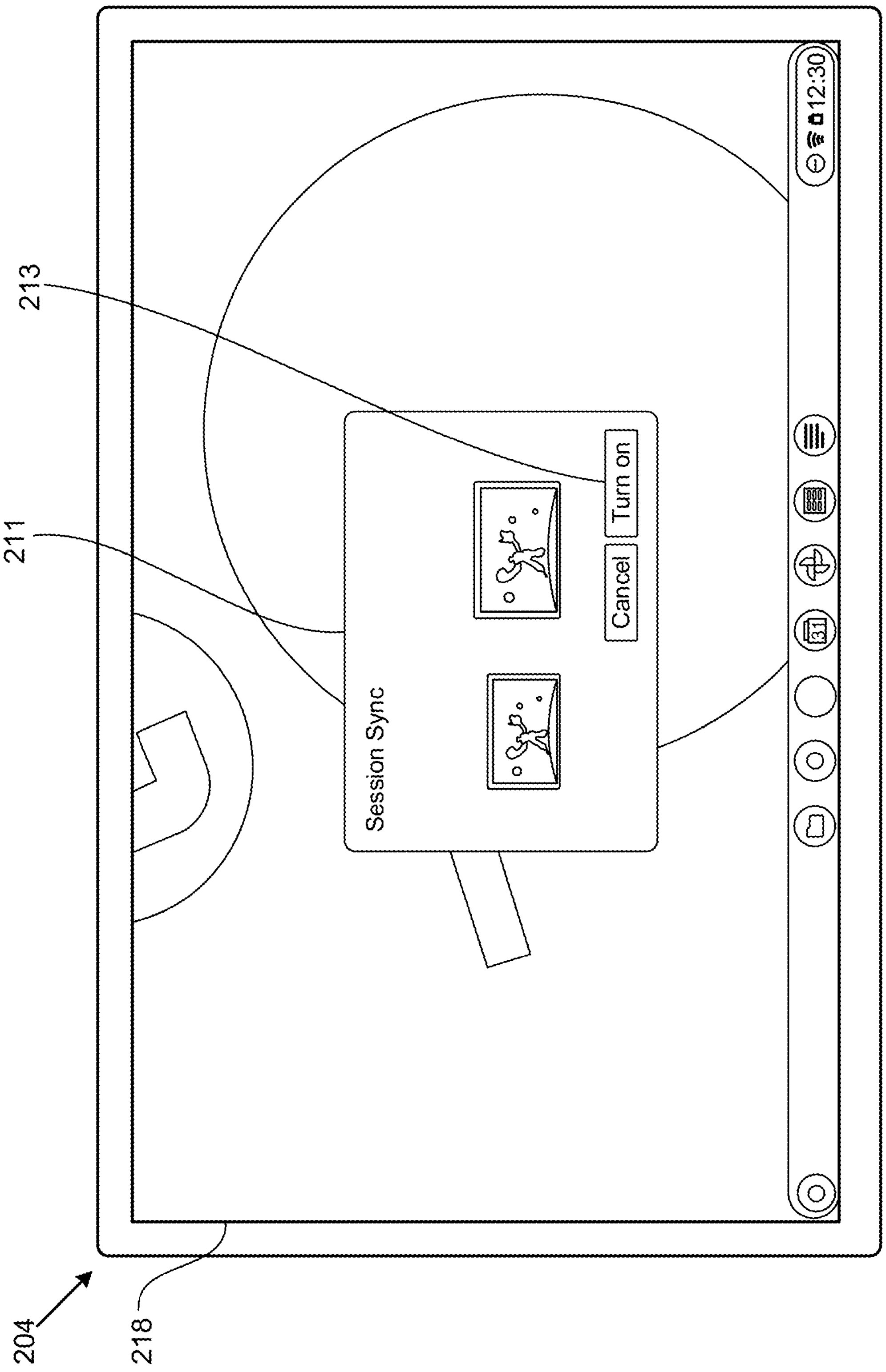
FIG. 2 illustrates a user interface of a computing device that displays a notification to enable session syncing according to an aspect.

FIG. 2 illustrates a user interface 218 of a computing device 204 that displays a session sync notification 211 according to an aspect. The computing device 204 may be an example of the computing device 104-1 of FIGS. 1A and 1B and may include any of the details discussed with reference to those figures. The session sync notification 211 allows the user to activate a session sync feature to enable the restoration of computing sessions across multiple devices. For example, a user may select a UI element 213 to activate (e.g., turn on) the session sync feature, thereby enabling the collection and transmission of the session data to the server computer 102 of FIG. 1A.

Figure 3:
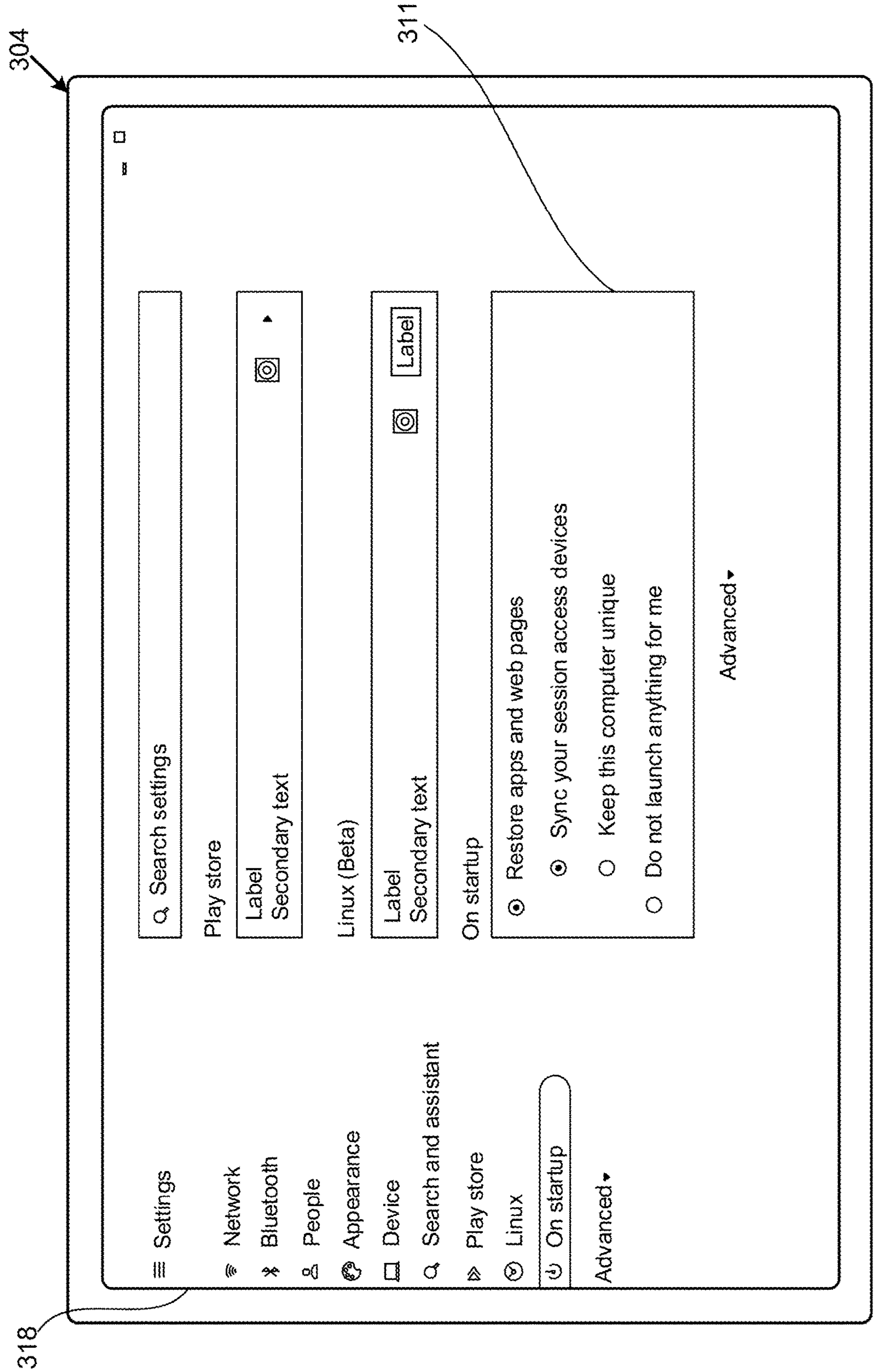
FIG. 3 illustrates a user interface of a computing device that displays a setting interface to select restoration settings upon startup according to an aspect.

FIG. 3 illustrates a user interface 318 of a computing device 304 that displays a setting interface according to an aspect. The computing device 304 may be an example of the computing device 104-1 of FIGS. 1A and 1B and may include any of the details discussed with reference to those figures. As shown in FIG. 3, the user interface 318 provides a session sync setting 311 that, when selected, activates the session sync feature. For example, the user can select to restore apps and web pages (or any other session item described herein) upon startup or decide to keep the computer unique.

Figure 4A:
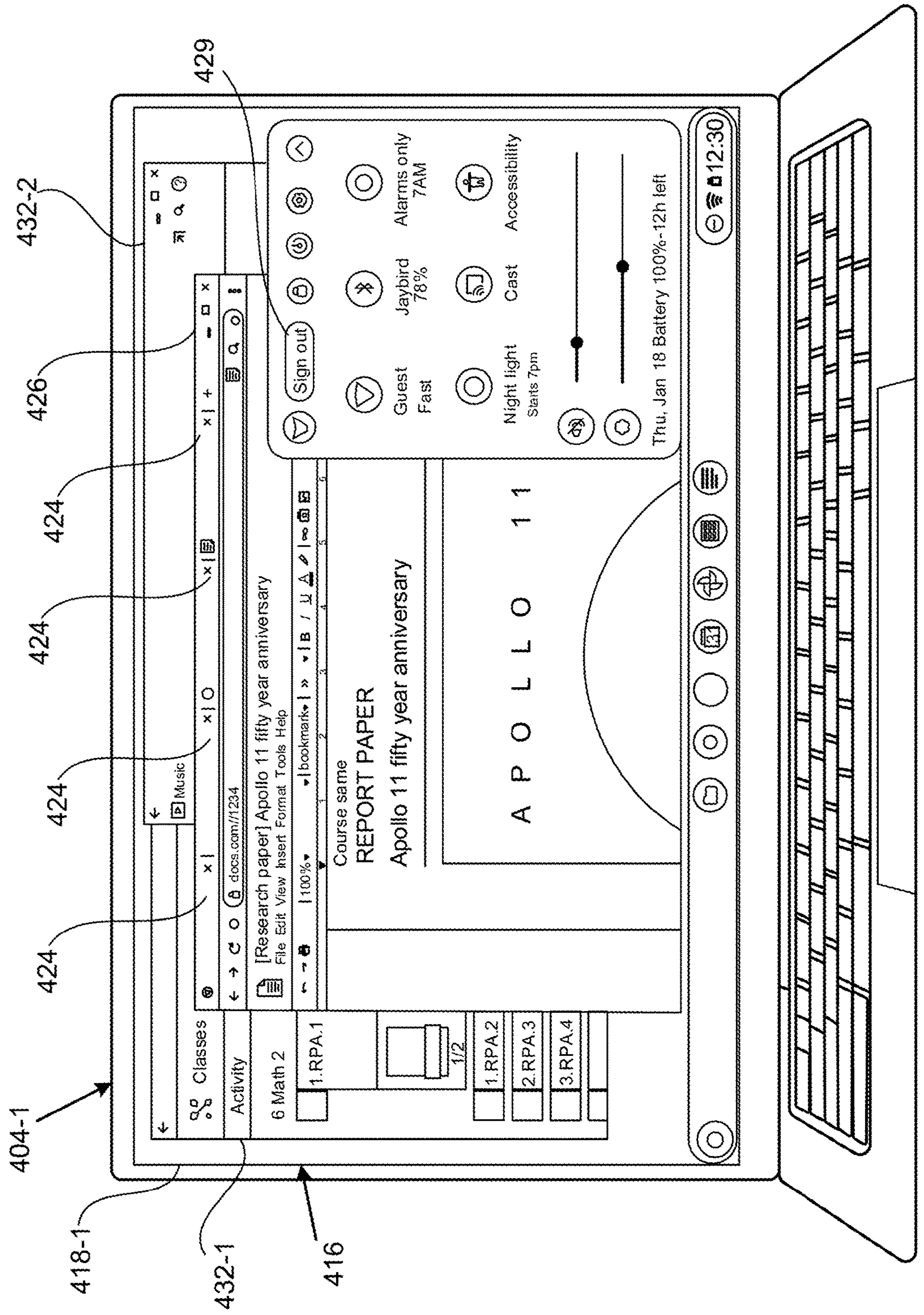
FIG. 4A illustrates a first computing device with an active computing session according to an aspect.
Figure 4B:
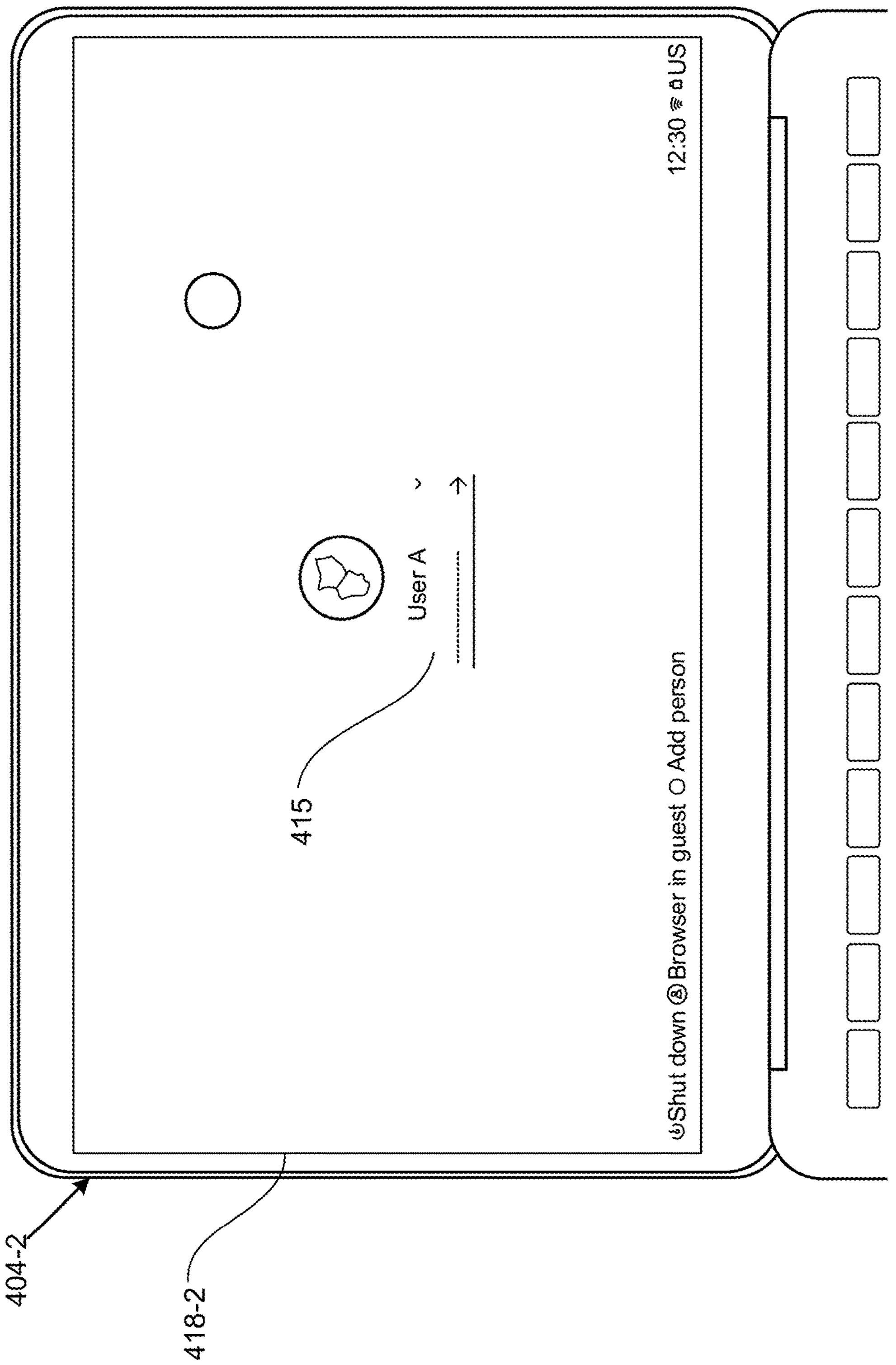
FIG. 4B illustrates a second computing device that displays a login screen according to an aspect.
Figure 4C:
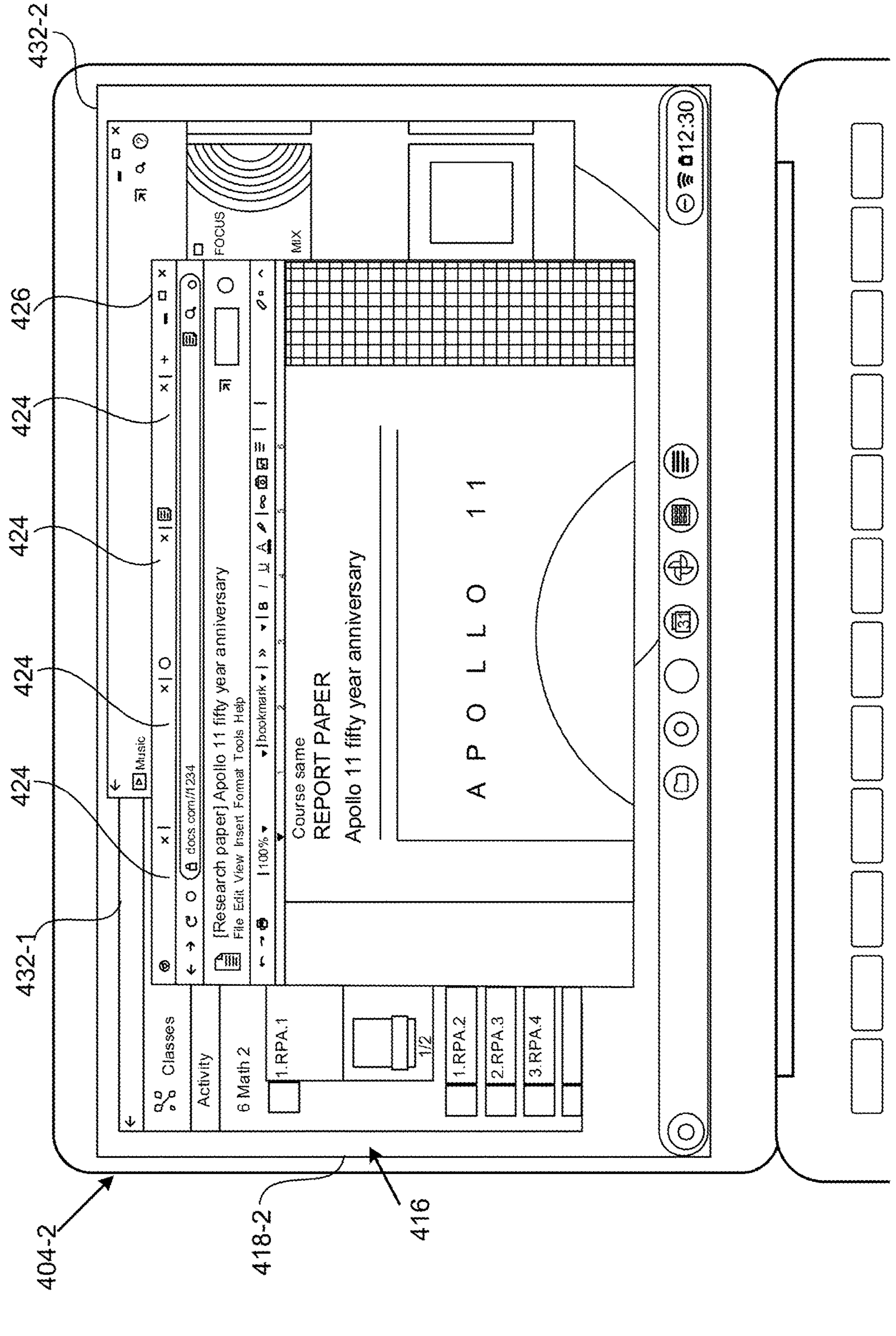
FIG. 4C illustrates a second computing device that displays a restored computing session according to an aspect.

FIGS. 4A through 4C illustrate a computing device 404-1 with an active computing session 416 according to an aspect. The computing device 404-1 may be an example of the computing device 104-1 of FIGS. 1A and 1B and may include any of the details discussed with reference to those figures. Referring to FIG. 4A, the user has launched and positioned a browser window 426 with a series of browser tabs 424 on a user interface 418-1 of the computing device 404-1. In some examples, the browser tabs 424 may include a browser tab 424 executing a web application (e.g., a document application). Referring to FIG. 4A, the user has launched and positioned a native application 432-1 and a native application 432-2 on the user interface 418-1.

As the user was launching and manipulating these session items, a session manager (e.g., the session manager 110-1 of FIG. 1A) generates and sends session data (e.g., the session data 108 of FIG. 1A) to a server computer (e.g., the server computer 102 of FIG. 1A) to be stored in a user account (e.g., user account 154-1) of the user. The session data may include an identification of the browser tabs 424, the native application 432-1, the native application 432-2, window positions of the browser window 426, the native application 432-1, the native application 432-2 on the user interface 418, the window sizes of the browser window 426, the native application 432-1, and the native application 432-2, whether an application is positioned in the foreground or background, the time in which the browser window 426, the native application 432-1, and the native application 432-2 were used (or last used), and/or a recency or last appearance order of the session items.

In some examples, while the session items are active (e.g., not closed out), the user may select a UI element 429 to log out of the computing device 404-1, which may end the computing session 416 on the computing device 404-1. Referring to FIG. 4B, the user may access the user account on another computing device (e.g., computing device 404-2). The computing device 404-2 may be any example of the computing device 104-2 of FIGS. 1A and 1B and may include any of the details discussed with reference to those figures. For example, upon activation of the computing device 404-2, a user interface 418-2 may display a login screen 415, which permits the user to provide an authentication credential such as a username/password. For example, the user may use a different computing device (e.g., computing device 404-2) to access the same user account that was used on the computing device 404-1.

In response to the user account being accessed from the computing device 404-2, referring to FIG. 4C, the computing device 404-2 may receive the session data from the server computer to restore the computing session 416 on the computing device 404-2. In some examples, after logging in, the computing session 416 is automatically restored on the computing device 404-2. The session data is configured to be used by the computing device 404-2 to launch and display the session items on the user interface 418-2 of the computing device 404-2. For example, the computing device 404-2 may launch and position the browser window 426 with the series of browser tabs 424 on the user interface 418-2, launch and position the application window of the native application 432-1 on the user interface 418-2, and launch and position the application window of the native application 432-2. In some examples, the browser window 426, the native application 432-1, and the native application 432-2 are arranged on the user interface 418-2 in the same manner these session items were displayed on the user interface 418-1 when the user logged out of the computing device 404-1. In some examples, the session items are launched according to a predefined order. In some examples, the predefined order is based on the type of session item (e.g., browser tabs are restored first, followed by native applications, etc.), the type of computing device (e.g., desktops may restore all the items at once, whereas low-powered laptops or tablets may restore the browser tabs followed by the native applications or ask whether the user would like to restore the native applications), or times in which the session items were last active (e.g., last launched, last manipulated, last used, etc.) on the computing device 404-1 (e.g., order to last appearance in which the last used items are restored first).

Figure 5:
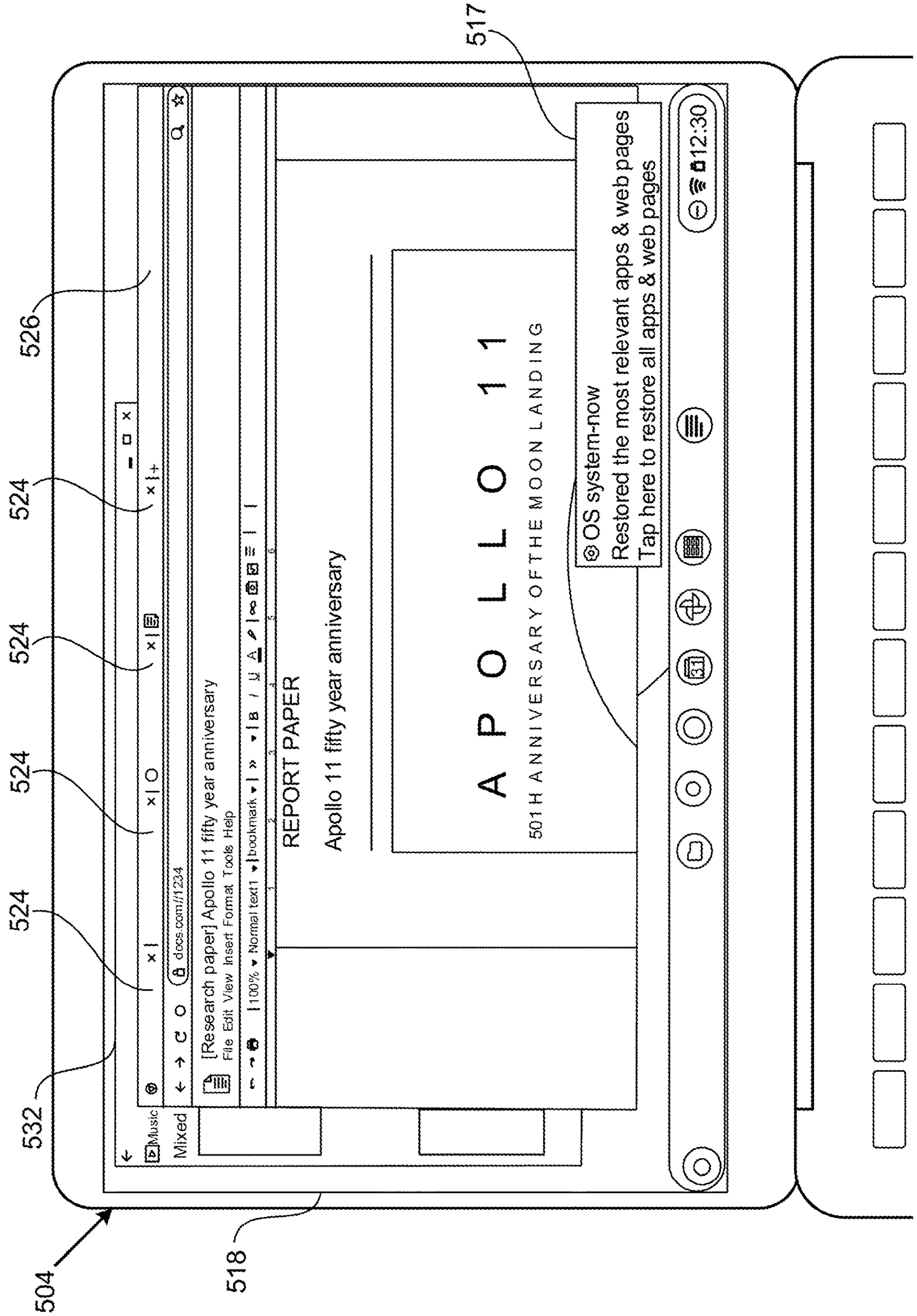
FIG. 5 illustrates a computing device that restores session items determined as relevant according to an aspect.

FIG. 5 illustrates a computing device 504 that restores session items determined as relevant according to an aspect. The computing device 504 may be an example of the computing device 104-2 of FIGS. 1A and 1B and may include any of the details discussed with reference to those figures. For example, the computing device 504 may automatically restore a subset of the session items, where the subset of session items are the ones that are determined as relevant.

For example, a machine learning algorithm (e.g., the machine learning algorithm 153 of FIG. 1A) may be used to predict which of the session items are likely to be used on the computing device 504. The machine learning algorithm has determined that browser tabs 524 and a native application 532 are relevant to the user (e.g., likely to be used by the user). As shown in FIG. 5, the operating system of the computing device 504 has restored a browser window 526 with the browser tabs 524 and the native application 532 on a user interface 518. The native application 532 may be an example of the native application 432-2 of FIGS. 4A through 4C. The machine learning algorithm has determined that one or more other applications (e.g., the native application 432-1 of FIGS. 4A through 4C) are not relevant to the user. The computing device 504 may render a notification 517 indicating that the relevant session items have been restored but provides an option to restore all the session items from the previously logged-in device.

Figure 6:
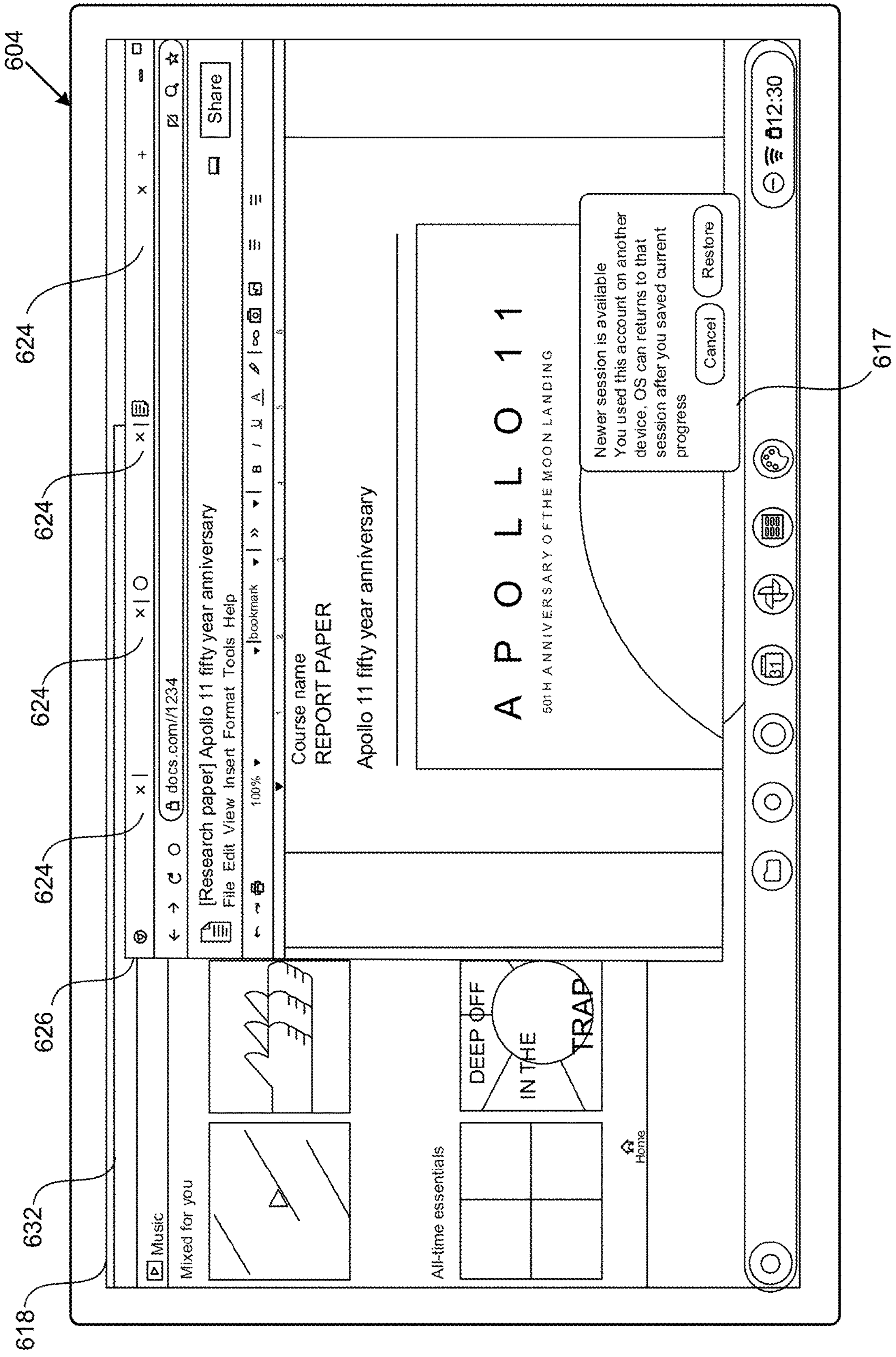
FIG. 6 illustrates a computing device that can update the computing session with a newer version according to an aspect.

FIG. 6 illustrates a computing device 604 that can update the computing session with a newer version according to an aspect. The computing device 604 may be an example of the computing device 104-2 of FIGS. 1A and 1B and may include any of the details discussed with reference to those figures.

In some examples, multiple computing sessions associated with a single user account may be occurring, and a newer session may become available. For example, the user may be switching between two devices, where one of the computing devices is the computing device 604. As shown in FIG. 6, the user may use the computing device 604 to launch and display a browser window 626 with a series of browser tabs 624 on a user interface 618 of the computing device 604. Also, the user may use the computing device 604 to launch and display a native application 632 on the user interface 618. Then, the user may switch to the other computing device (e.g., computing device 104-2, computing device 404-2) and sync this computing session on the other computing device. Then, the user may further manipulate the restored browser window 626 or open new applications on the other computing device. Then, the user may switch back to the computing device 604. In some examples, the computing device 604 may render a notification 617 informing the user that a new session is available. When the user selects the UI element indicating to restore the newer session, the computing device 604 may restore those session items from the other computing device.

Figure 7A:
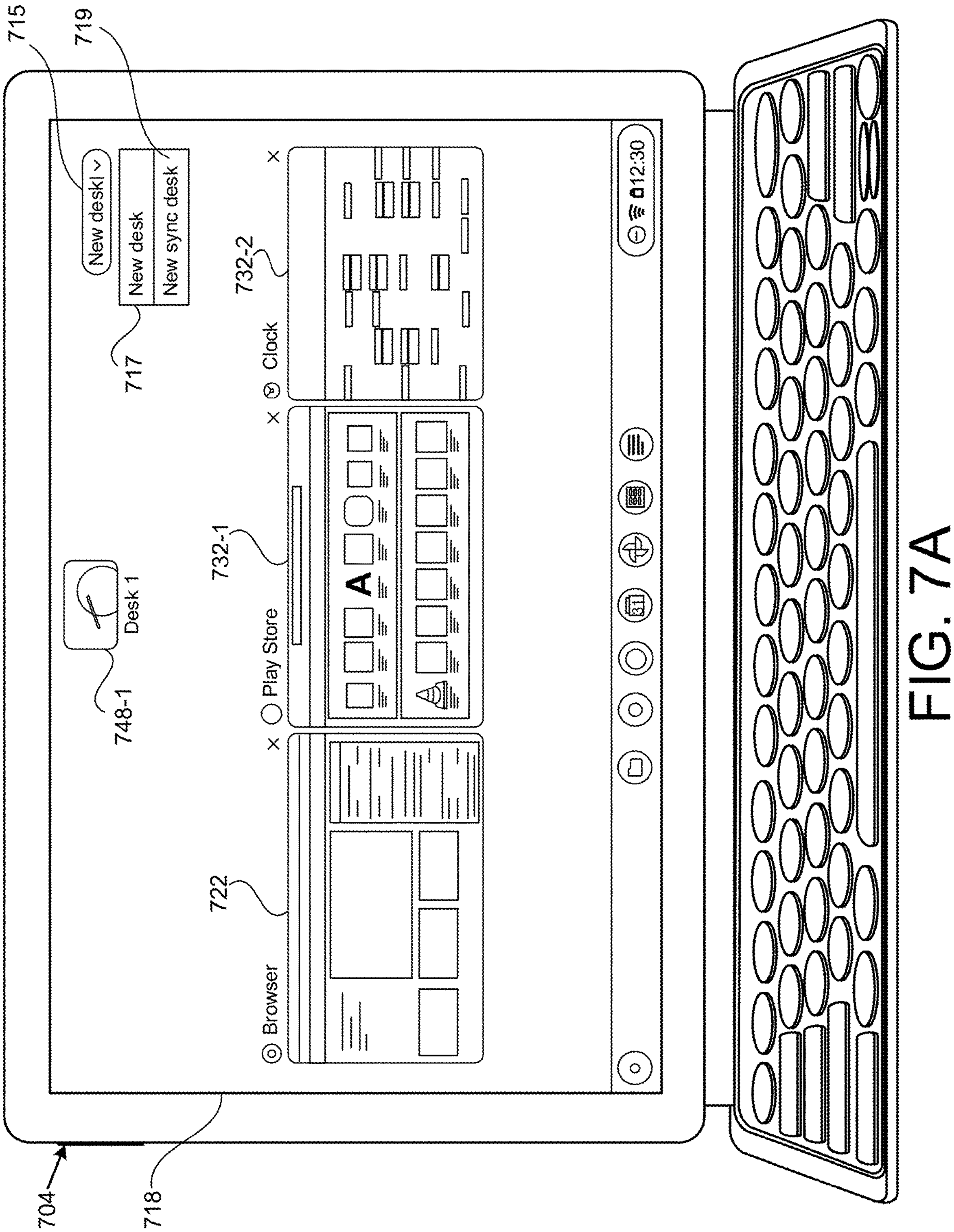
FIG. 7A illustrates a computing device for creating a new virtual desk that can be synced according to an aspect.
Figure 7B:
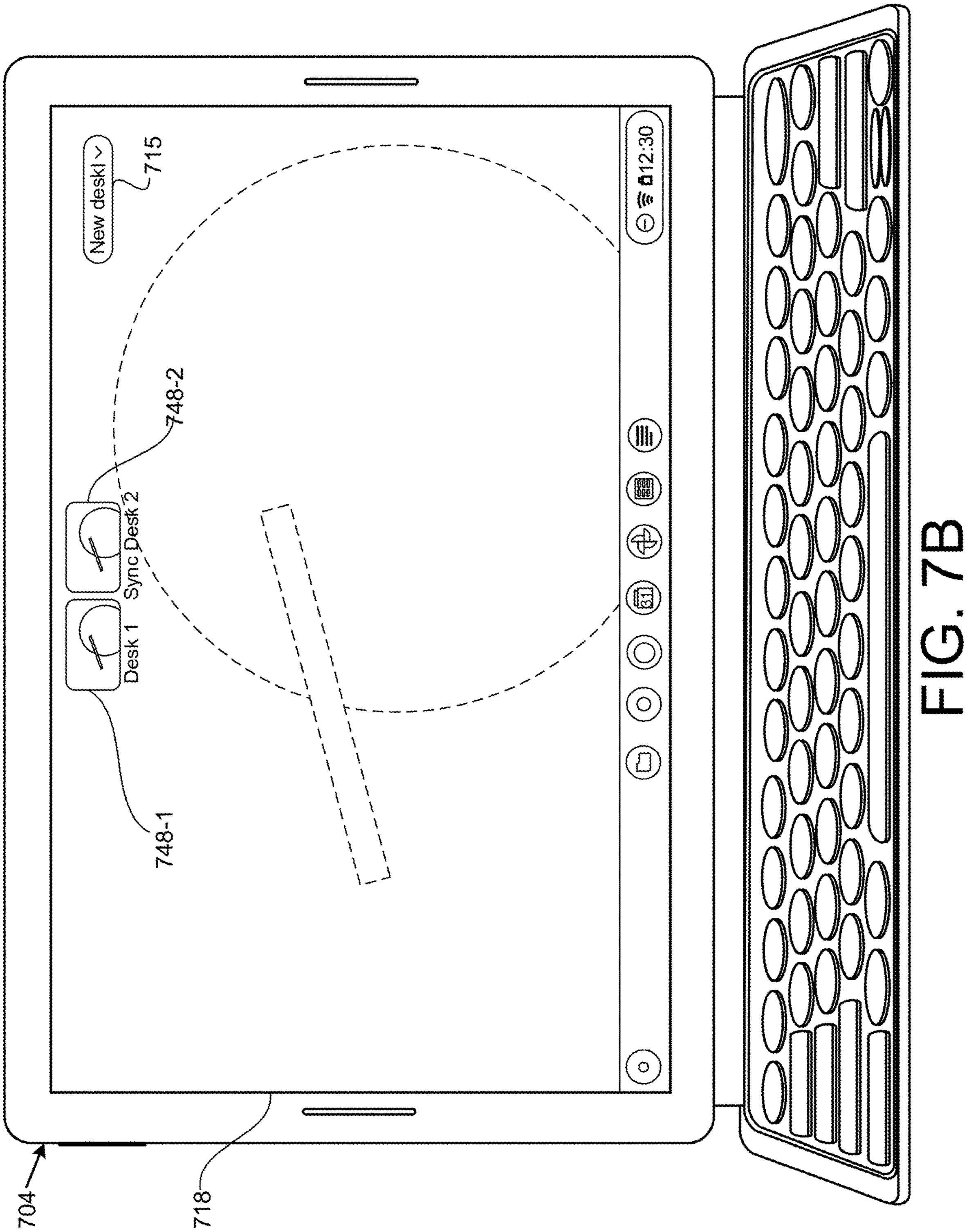
FIG. 7B illustrates a computing device with a new virtual desk that can be synced according to an aspect.

FIGS. 7A and 7B illustrates a computing device 704 for syncing virtual desks according to an aspect. The computing device 704 may be an example of the computing device 104-1 of FIGS. 1A and 1B and may include any of the details of the system 100 of FIGS. 1A and 1B. As shown in FIG. 7A, a user interface 718 displays the session items associated with a virtual desk 748-1 (e.g., desk 1). For example, the virtual desk 748-1 includes a browser application 722 (e.g., a browser), a native application 732-1 (e.g., play store application), and a native application 732-2 (e.g., clock application). The user interface 718 may provide a menu 715 that, when selected, provides a menu item 717 for a new virtual desk and a menu item 719 for a new sync desk. If the user selects the menu item 717, a new virtual desk will be created that is not synced across devices. However, if the user selects menu item 719, as shown in FIG. 7B, a new virtual desk (e.g., virtual desk 748-2) is created that can be synced across multiple devices. For example, the user can select the virtual desk 748-2, and then launch session items and arrange them on the user interface 718. Then, the user may switch to another device, and then restore the virtual desk 748-2 on the other device. The session items from the virtual desk 748-2 may be restored according to any of the techniques discussed herein.

Figure 8A:
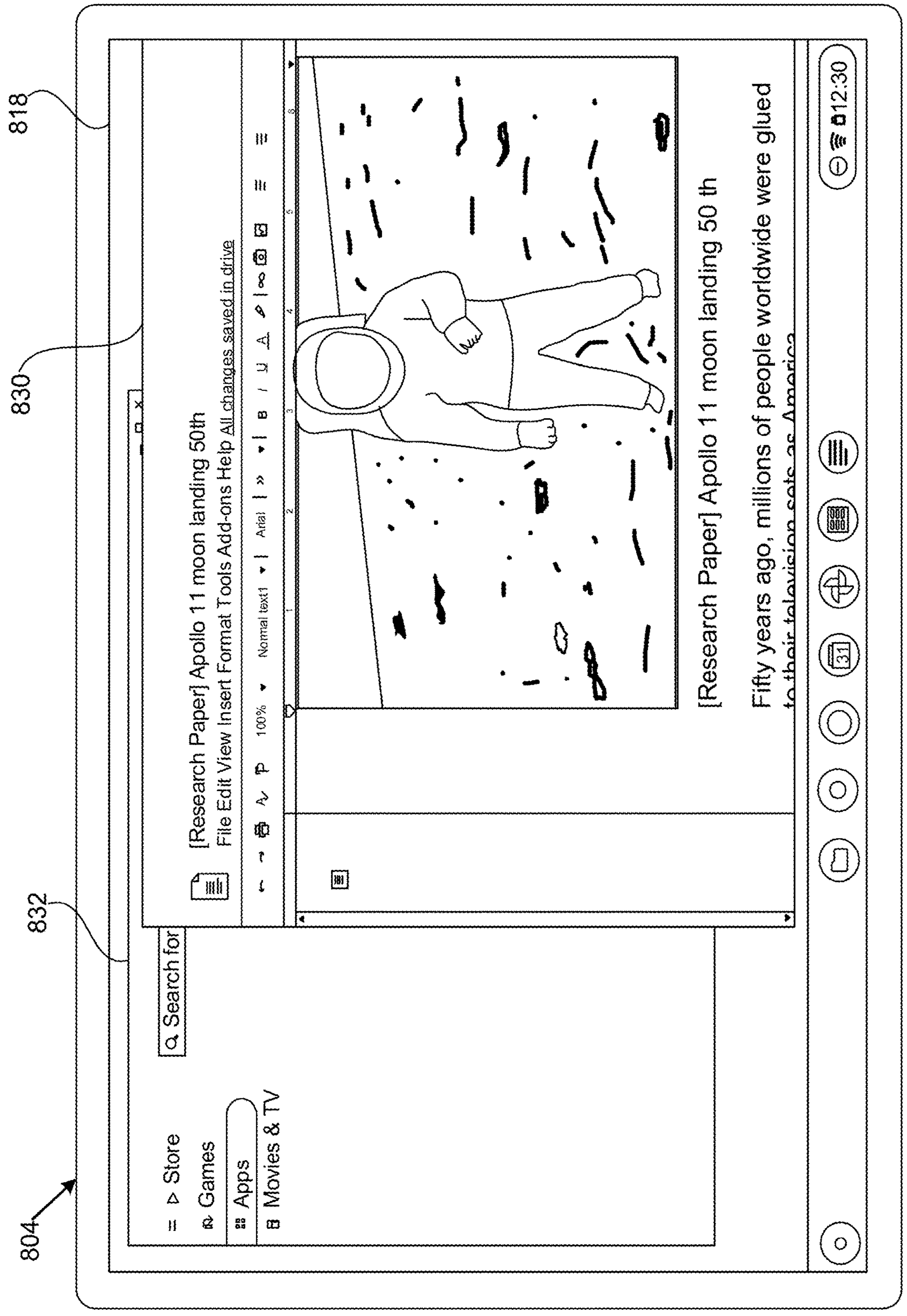
FIG. 8A illustrates a computing device with an active computing session according to an aspect.
Figure 8B:
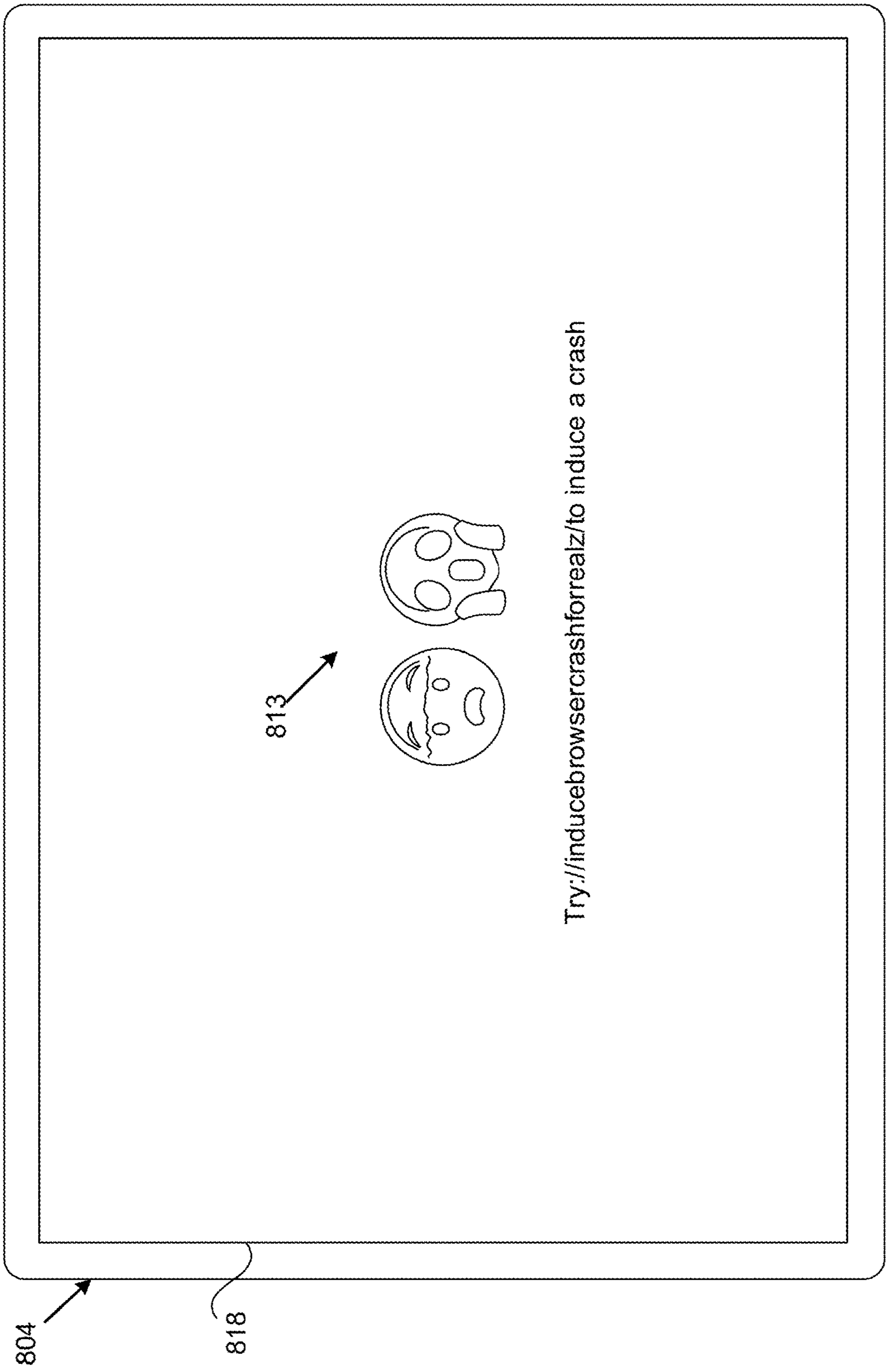
FIG. 8B illustrates a computing device that displays a notification indicating that a crash event was detected according to an aspect.
Figure 8C:
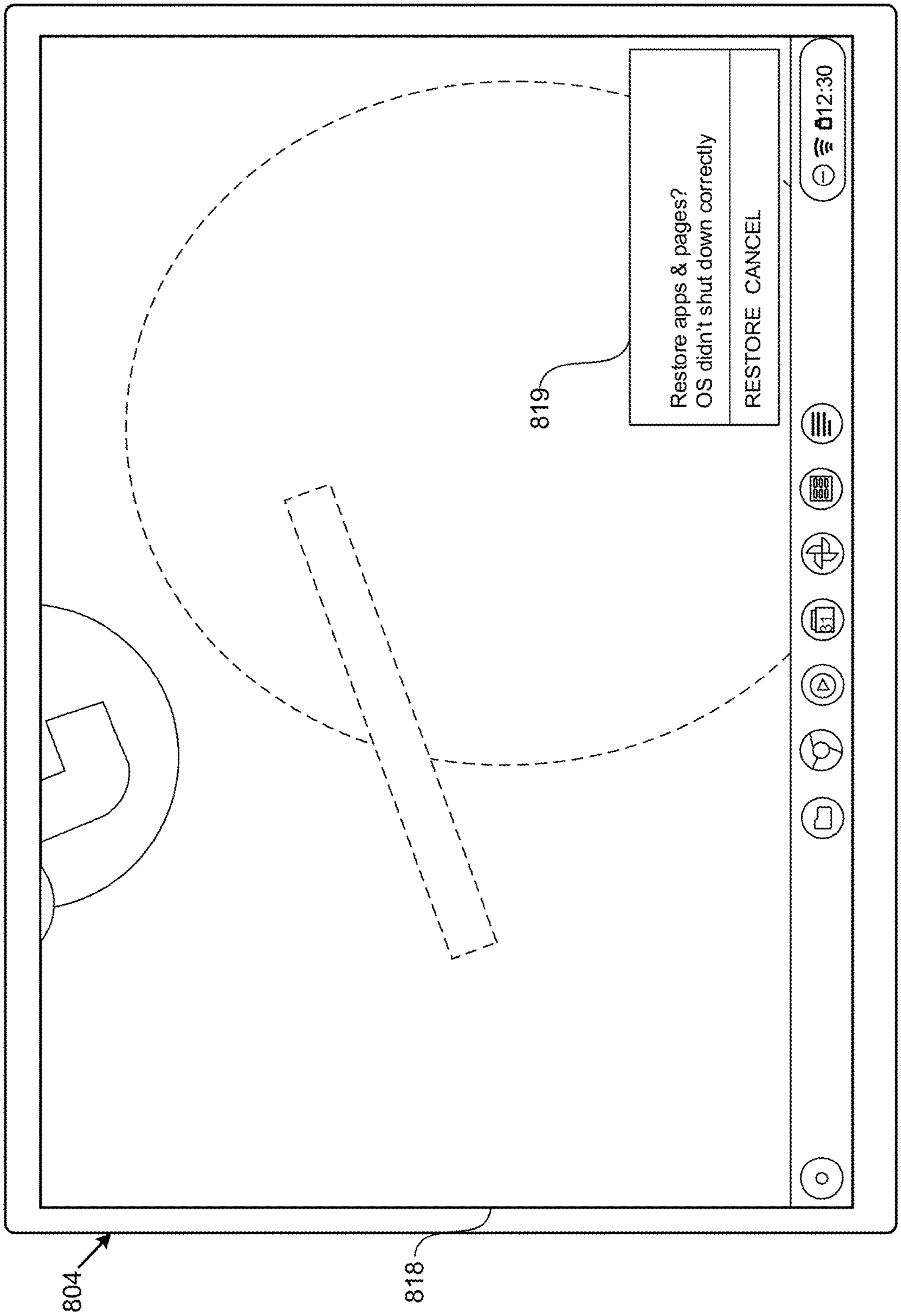
FIG. 8C illustrates a computing device with a restored computing session according to an aspect.

FIGS. 8A through 8C illustrate an example of restoring a computing session in response to a crash event according to an aspect. Referring to FIG. 8A, a web application 830 and a native application 832 are rendered on a user interface 818 of a computing device 804. The computing device 804 may be an example of the computing device 104-1 of FIGS. 1A and 1B and may include any of the details of the system 100 of FIGS. 1A and 1B. Referring to 8B, a crash event may occur, and the user interface 818 may provide a notification 813 informing the user of the crash event. In some examples, the user may restart or re-log into the computing device 804, and, as shown in FIG. 8C, the user interface 818 may provide a notification 819 that provides the user with an option to restore the previous computing session. When selected, the computing device 804 may restore the computing session such that the native application 832 and the web application 830 (or any type of session item discussed above) are launched and positioned in the same manner as they were before the crash event occurred.

Figure 9:
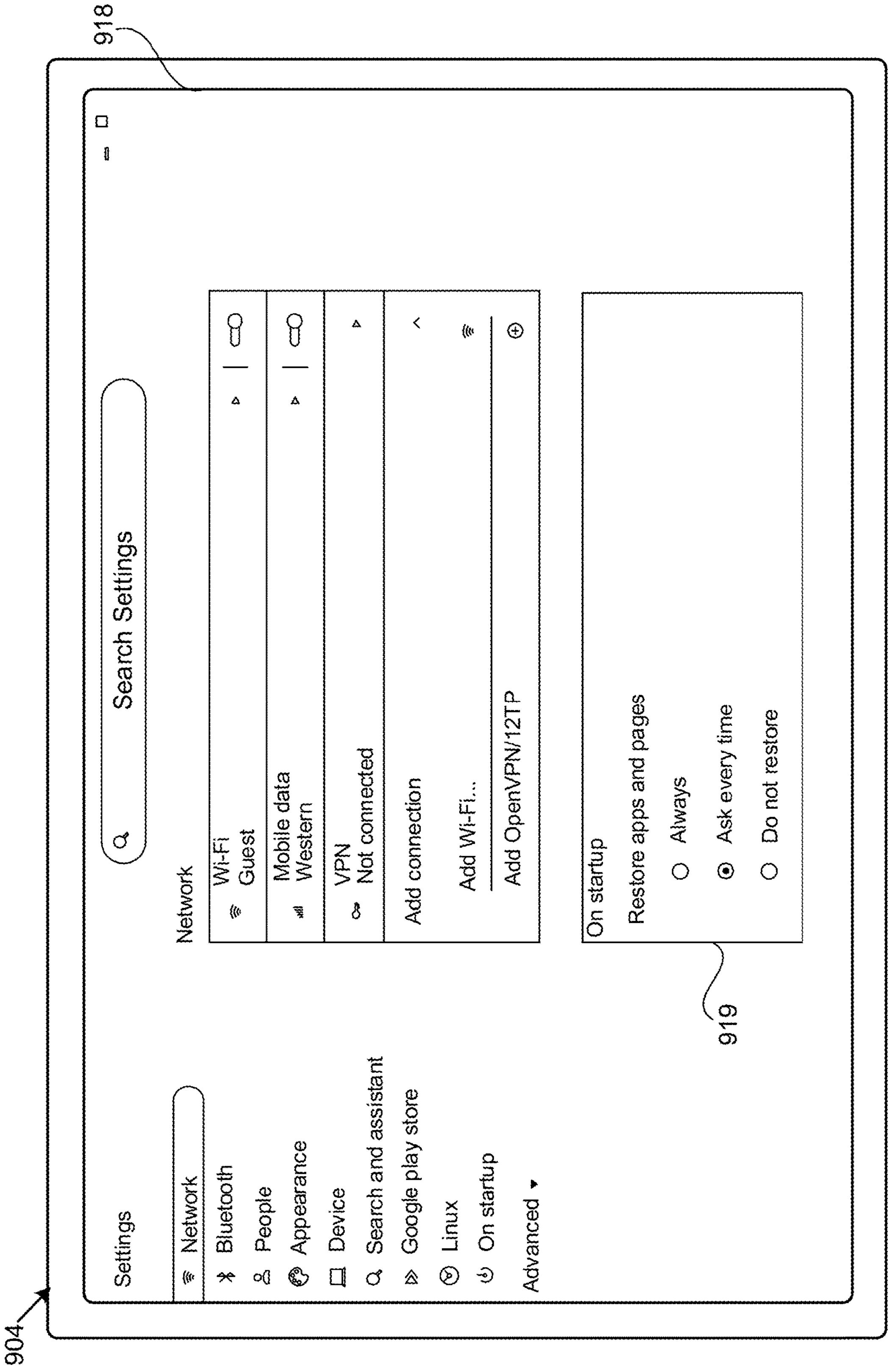
FIG. 9 illustrates a user interface of a computing device that displays a setting interface according to an aspect.

FIG. 9 illustrates a user interface 918 of a computing device 904 that displays a setting interface according to an aspect. The computing device 904 may be an example of the computing device 104-1 of FIGS. 1A and 1B and may include any of the details of the system 100 discussed with reference to those figures. As shown in FIG. 9, the user interface 918 provides restore options 919. The restore options 919 provide selectable options that indicate the manner in which the restoration process occurs. For example, the restore options 919 may permit the user to automatically restore the session items on startup, ask whether the session items should be restored upon startup, or do not restore the session items upon start up.

Figure 10:
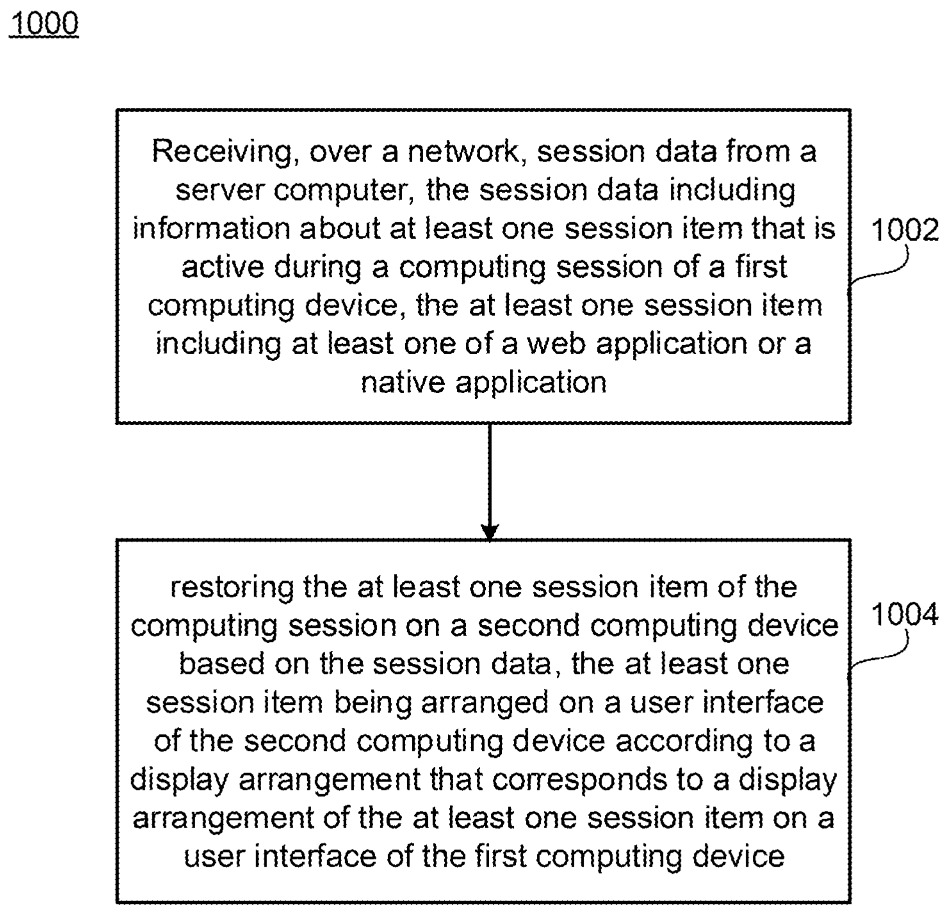
FIG. 10 is a flowchart depicting example operations of restoring session items according to an aspect.

FIG. 10 is a flowchart 1000 depicting example operations of restoring session items according to an aspect. Although the flowchart 1000 of FIG. 10 is explained with respect to the system 100 of FIGS. 1A and 1B, the flowchart 1000 may be applicable to any of the embodiments discussed herein. Although the flowchart 1000 of FIG. 10 illustrates the operations in sequential order, it will be appreciated that this is merely an example, and that additional or alternative operations may be included. Further, operations of FIG. 10 and related operations may be executed in a different order than that shown, or in a parallel or overlapping fashion.

Operation 1002 includes receiving, over a network 150, session data 108 from a server computer 102, where the session data 108 includes information about at least one session item 120 that is active during a computing session 116 of a first computing device 104-1. The at least one session item 120 including at least one of a web application 130 or a native application 132. In some examples, the session data 108 includes information about all session items 120 enabled by the user during the computing session 116 on the first computing device 104-1. The session items 120 may include browser tabs 124, web applications 130, native applications 132, graphical control elements 134, display states (e.g., split screen feature 140, picture-in-picture feature 142, full screen mode 146, etc.), and/or virtual desks 148.

Operation 1004 includes restoring the at least one session item 120 of the computing session 116 on a second computing device 104-2 based on the session data 108. The at least one session item 120 is arranged on a user interface 118-2 of the second computing device 104-2 according to a display arrangement that corresponds to a display arrangement of the at least one session item 120 on a user interface 118-1 of the first computing device 104-1.

In some examples, the session restorer 112-2 may receive the session data 108 from the session manager 110-2, and the session restorer 112-2 may restore the computing session 116 on the second computing device 104-2. In some examples, the session restorer 112-2 restores the session items 120 on the user interface 118-2 in the same manner as they were displayed on the first computing device 104-1. For example, based on the session data 108 received from the session synchronizer 152, the operating system 106-2 of the second computing device 104-2 may synchronize the session items 120 from the previously logged device (e.g., the first computing device 104-1) to the currently logged device (e.g., the second computing device 104-2). In some examples, the operating system 106-2 of the second computing device 104-2 synchronizes the session items 120 if the user has opted for session synchronization across multiple devices during the device startup.

Figure 11:
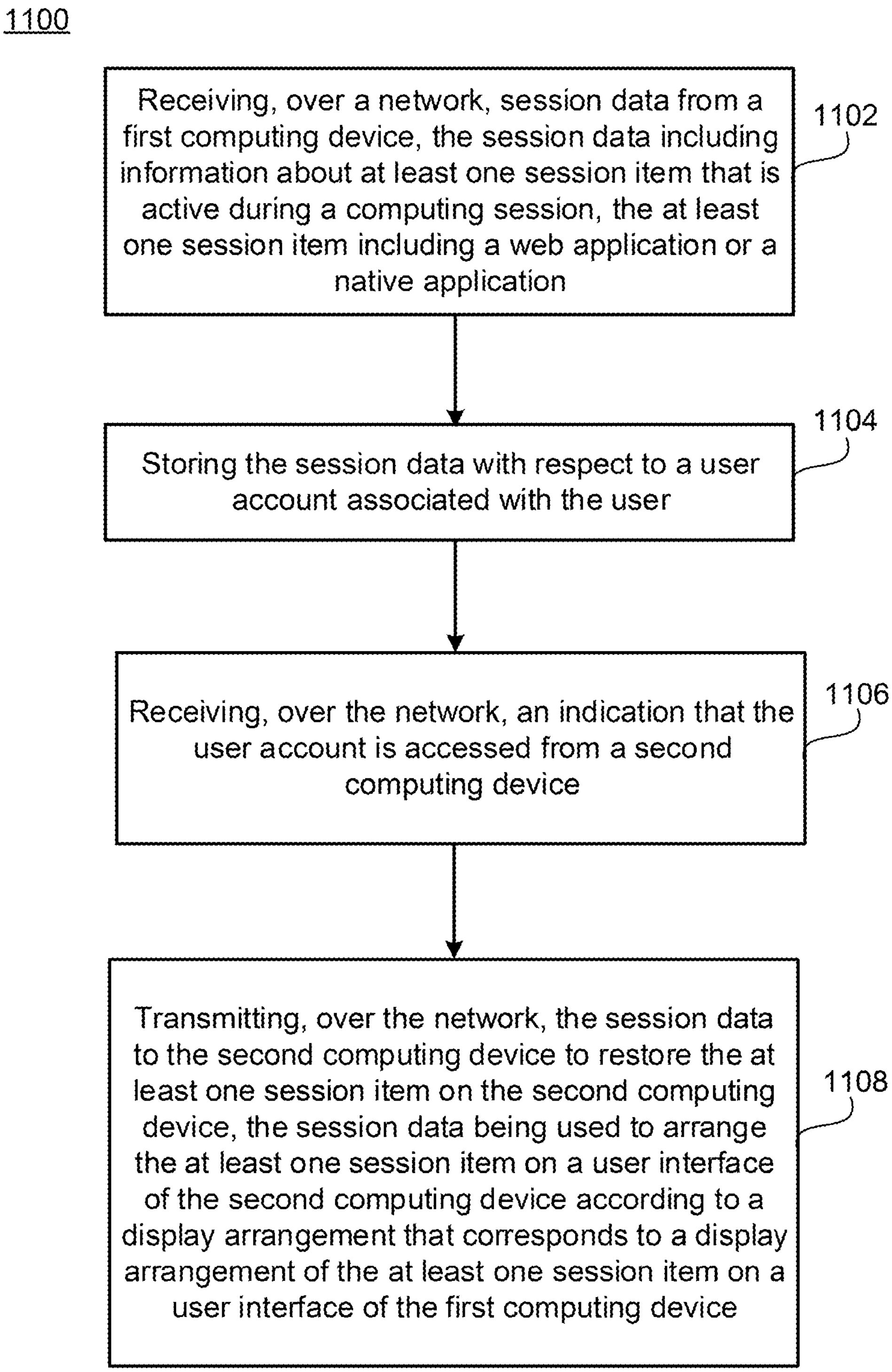
FIG. 11 is a flowchart 1100 depicting example operations of restoring session items to sync across another device according to an aspect.

FIG. 11 is a flowchart 1100 depicting example operations of syncing a computing session across multiple devices according to an aspect. Although the flowchart 1100 of FIG. 11 is explained with respect to the system 100 of FIGS. 1A and 1B, the flowchart 1100 may be applicable to any of the embodiments discussed herein. Although the flowchart 1100 of FIG. 11 illustrates the operations in sequential order, it will be appreciated that this is merely an example, and that additional or alternative operations may be included. Further, operations of FIG. 11 and related operations may be executed in a different order than that shown, or in a parallel or overlapping fashion.

Operation 1102 includes receiving, over a network 150, session data 108 from a first computing device 104-1, where the session data 108 includes information about at least one session item 120 that is active during a computing session 116. In some examples, the at least one session item 120 includes a web application 130 or a native application 132. In some examples, the session data 108 includes information about all session items 120 enabled by the user during the computing session 116 on the first computing device 104-1. The session items 120 may include browser tabs 124, web applications 130, native applications 132, graphical control elements 134, display states (e.g., split screen feature 140, picture-in-picture feature 142, full screen mode 146, etc.), and/or virtual desks 148.

In some examples, the native application 132 is a program executable by an operating system of the first computing device 104-1 or the second computing device 104-2. In some examples, the web application 130 is a program executable by a web server and delivered through a browser interface of a browser application 122. In some examples, the session data 108 includes information about which session item 120 was launched during the computing session 116, window position of each session item 120, and window size of each session item 120.

In some examples, the session data 108 includes information on whether an application 128 is positioned in the foreground or background, whether an application 128 is focused or non-focused, the time in which the session items 120 were used (or last used), and/or a recency or last appearance order of the session items 120. In some examples, the session data 108 may include session item assignment to virtual desk 148 and/or physical display (in multi-display setup). For example, the session data 108 may identify which application 128 (or generally which session item 120) is assigned to which virtual desk 148. Also, the session data 108 may identify which application 128 (or generally which session item 120) is displayed on which physical display (if a multi-display setup is used). In some examples, the session data 108 may include application navigation state (e.g., activity stack or other identification of a screen that the application 128 was displaying). For example, with respect to a particular application 128, the session data 108 may include information about the underlying navigation state, e.g., identification of a screen that the application 128 was displaying.

Operation 1104 includes storing the session data 108 with respect to a user account 154-1 associated with the user. For example, as the user establishes a session item 120 on the user interface 118-1, the session manager 110-1 transmits session data 108 about the session item 120 to the server computer 102. At the server computer 102, the session synchronizer 152 stores the session data 108 at the user account 154-1.

Operation 1106 includes receiving, over the network 150, an indication that the user account 154-1 is accessed from a second computing device 104-2. For example, the user may access the user account 154-1 on the second computing device 104-2, which may include providing a username/password or other type of authentication credential. For example, the user may use a different computing device (e.g., the second computing device 104-2) to access the same user account (e.g., user account 154-1) that was used on the first computing device 104-1. In some examples, the user creates the computing session 116 on the first computing device 104-1 using the user account 154-1 but accesses the computing device 104-2 using the authentication credential of a user account 154-2 (e.g., which also belongs to the same user).

Operation 1108 includes transmitting, over the network 150, the session data 108 to the second computing device 104-2 to restore the at least one session item 120 on the second computing device 104-2. The session data 108 is used to arrange the at least one session item 120 on a user interface 118-2 of the second computing device 104-2 according to a display arrangement that corresponds to a display arrangement of the at least one session item 120 on a user interface 118-1 of the first computing device 104-1.

Figure 12:
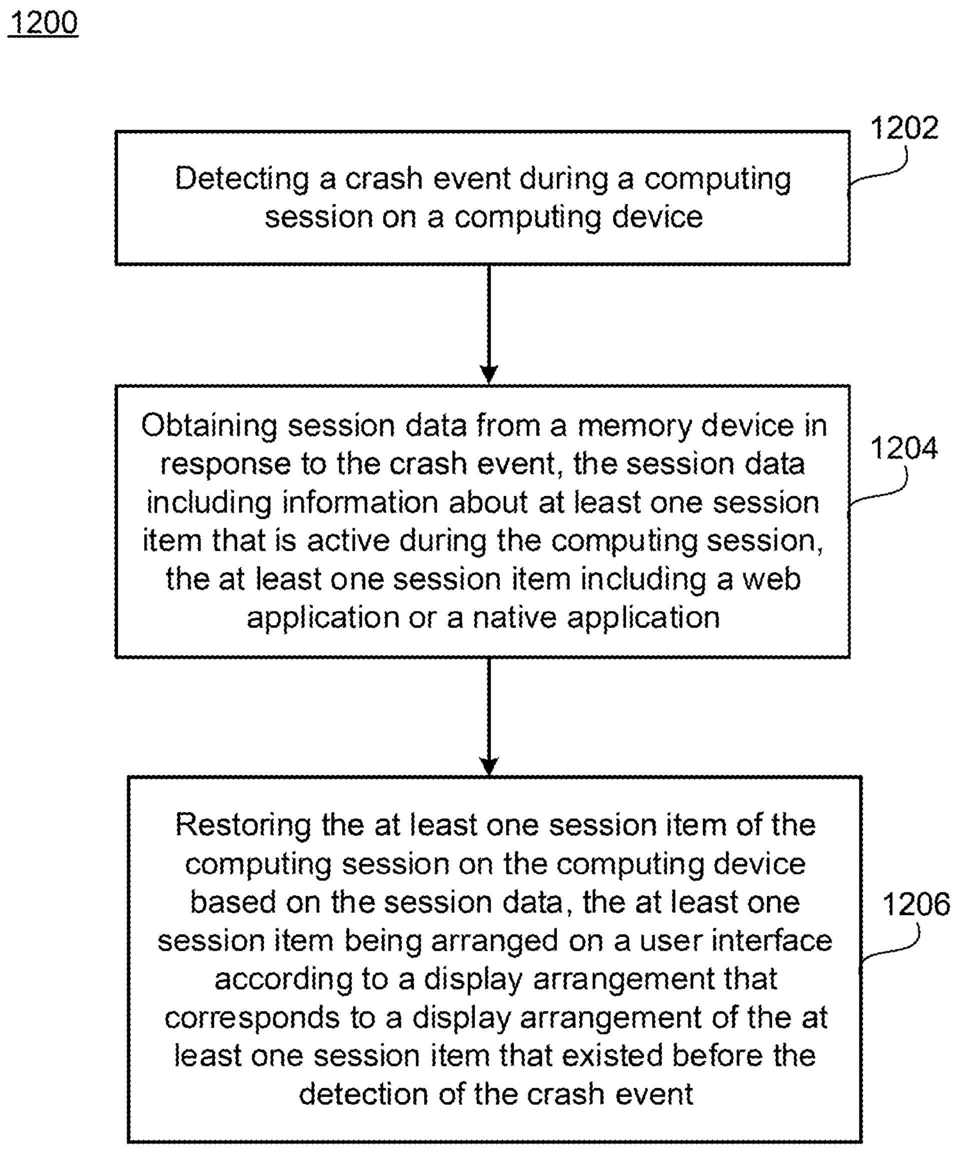
FIG. 12 is a flowchart 1200 depicting example operations of restoring session items in response to a crash event according to an aspect.

FIG. 12 is a flowchart 1200 depicting example operations of restoring session items in response to a crash event according to an aspect. Although the flowchart 1200 of FIG. 12 is explained with respect to the system 100 of FIGS. 1A and 1B, the flowchart 1200 may be applicable to any of the embodiments discussed herein. Although the flowchart 1200 of FIG. 12 illustrates the operations in sequential order, it will be appreciated that this is merely an example, and that additional or alternative operations may be included. Further, operations of FIG. 12 and related operations may be executed in a different order than that shown, or in a parallel or overlapping fashion.

Operation 1202 includes detecting a crash event 114 during a computing session 116 on a computing device 104-1. For example, the session manager 110-1 may detect a crash event 114 in which some or all of the session items 120 are stopped or not displayed on the user interface 118-1 of the computing device 104-1.

Operation 1204 includes obtaining session data 108 from a memory device 109 in response to the crash event 114. In some examples, in response to the crash event 114, the session manager 110-1 may obtain the session data 108, e.g., either from the memory device 109 on the computing device 104-1 or from the server computer 102. The session data 108 includes information about at least one session item 120 that is active during the computing session 116. The at least one session item 120 includes a web application 130 or a native application 132. In some examples, the session data 108 includes information about all session items 120 enabled by the user during the computing session 116 on the computing device 104-1. The session items 120 may include browser tabs 124, web applications 130, native applications 132, graphical control elements 134, display states (e.g., split screen feature 140, picture-in-picture feature 142, full screen mode 146, etc.), and/or virtual desks 148.

Operation 1206 includes restoring the at least one session item 120 of the computing session 116 on the computing device 104-1 based on the session data 108. The at least one session item 120 is arranged on a user interface 118-1 according to a display arrangement that corresponds to a display arrangement of the at least one session item 120 that existed before the detection of the crash event 114. The session manager 110-1 may provide the session data 108 to the session restorer 112-1, where the session restorer 112-1 may use the session data 108 to restore the session items 120 on the user interface 118-1 of the computing device 104-1. The session restorer 112-1 may restore the session items 120 according to any of the techniques discussed above with respect to session synchronization across multiple devices.

Figure 13:
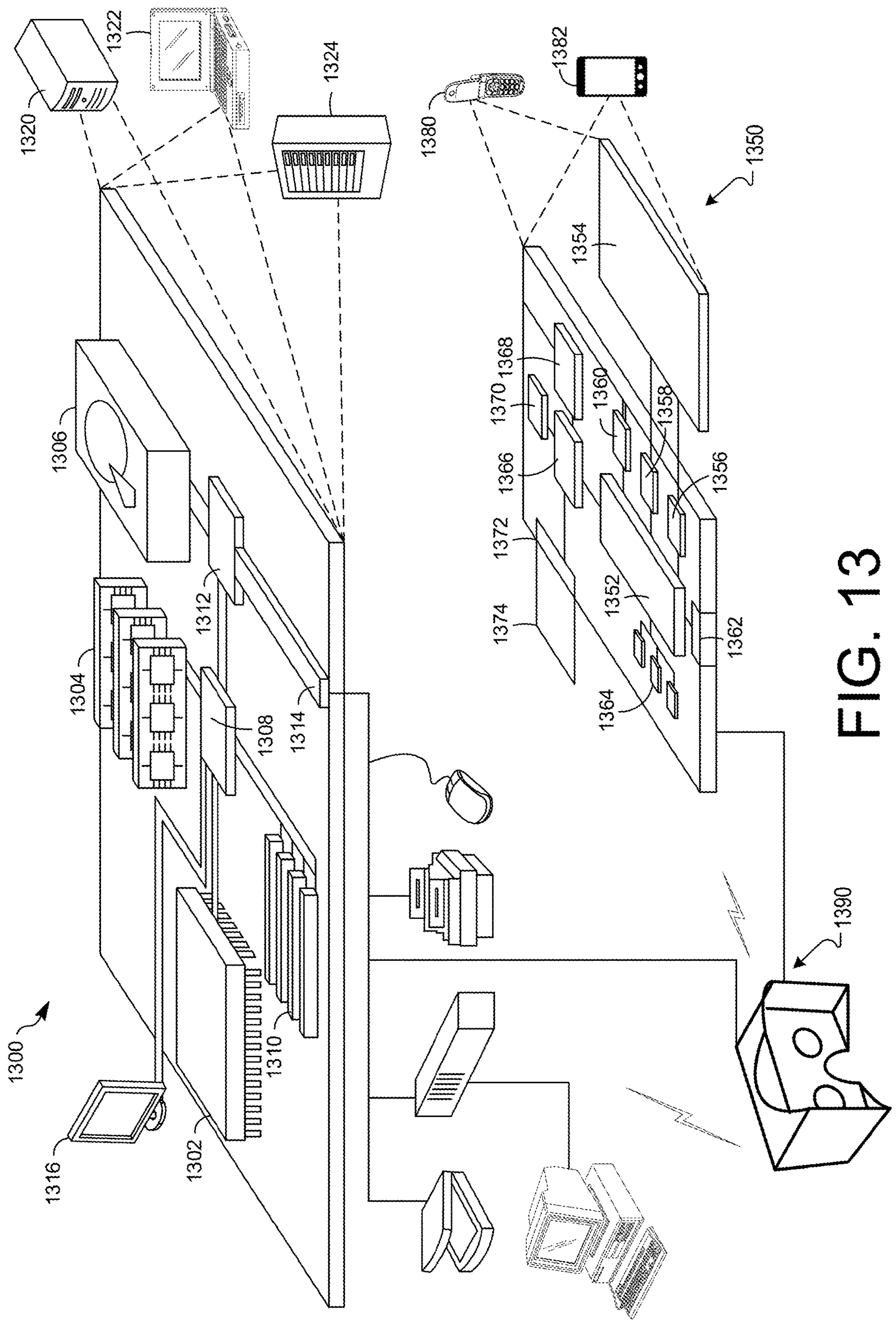
FIG. 13 shows an example of a computer device and a mobile computer device according to an aspect.

FIG. 13 shows an example of a computer device 1300 and a mobile computer device 1350, which may be used with the techniques described here. In some implementations, the computer device 1300 is an example of the computing device 104-1 or the computing device 104-2. In some implementations, the computer device 1300 is an example of the server computer 102. In some implementations, the mobile computer device 1350 is an example of the computing device 104-1 or the computing device 104-2. Computing device 1300 is intended to represent various forms of digital computers, such as laptops, desktops, tablets, workstations, personal digital assistants, televisions, servers, blade servers, mainframes, and other appropriate computing devices. Computing device 1350 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1300 includes a processor 1302, memory 1304, a storage device 1306, a high-speed interface 1308 connecting to memory 1304 and high-speed expansion ports 1310, and a low speed interface 1312 connecting to low speed bus 1314 and storage device 1306. The processor 1302 can be a semiconductor-based processor. The memory 1304 can be a semiconductor-based memory. Each of the components 1302, 1304, 1306, 1308, 1310, and 1312, are interconnected using various busses, and may be mounted on a common motherboard or in other manners as appropriate. The processor 1302 can process instructions for execution within the computing device 1300, including instructions stored in the memory 1304 or on the storage device 1306 to display graphical information for a GUI on an external input/output device, such as display 1316 coupled to high speed interface 1308. In other implementations, multiple processors and/or multiple buses may be used, as appropriate, along with multiple memories and types of memory. Also, multiple computing devices 1300 may be connected, with each device providing portions of the necessary operations (e.g., as a server bank, a group of blade servers, or a multi-processor system).

The memory 1304 stores information within the computing device 1300. In one implementation, the memory 1304 is a volatile memory unit or units. In another implementation, the memory 1304 is a non-volatile memory unit or units. The memory 1304 may also be another form of computer-readable medium, such as a magnetic or optical disk.

The storage device 1306 is capable of providing mass storage for the computing device 1300. In one implementation, the storage device 1306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1304, the storage device 1306, or memory on processor 1302.

The high speed controller 1308 manages bandwidth-intensive operations for the computing device 1300, while the low speed controller 1312 manages lower bandwidth-intensive operations. Such allocation of functions is exemplary only. In one implementation, the high-speed controller 1308 is coupled to memory 1304, display 1316 (e.g., through a graphics processor or accelerator), and to high-speed expansion ports 1310, which may accept various expansion cards (not shown). In the implementation, low-speed controller 1312 is coupled to storage device 1306 and low-speed expansion port 1314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1300 may be implemented in a number of different forms, as shown in the figure. For example, it may be implemented as a standard server 1320, or multiple times in a group of such servers. It may also be implemented as part of a rack server system 1324. In addition, it may be implemented in a personal computer such as a laptop computer 1322. Alternatively, components from computing device 1300 may be combined with other components in a mobile device (not shown), such as device 1350. Each of such devices may contain one or more of computing devices 1300, 1350, and an entire system may be made up of multiple computing devices 1300, 1350 communicating with each other.

Computing device 1350 includes a processor 1352, memory 1364, an input/output device such as a display 1354, a communication interface 1366, and a transceiver 1368, among other components. The device 1350 may also be provided with a storage device, such as a microdrive or other device, to provide additional storage. Each of the components 1350, 1352, 1364, 1354, 1366, and 1368, are interconnected using various buses, and several of the components may be mounted on a common motherboard or in other manners as appropriate.

The processor 1352 can execute instructions within the computing device 1350, including instructions stored in the memory 1364. The processor may be implemented as a chipset of chips that include separate and multiple analog and digital processors. The processor may provide, for example, for coordination of the other components of the device 1350, such as control of user interfaces, applications run by device 1350, and wireless communication by device 1350.

Processor 1352 may communicate with a user through control interface 1358 and display interface 1356 coupled to a display 1354. The display 1354 may be, for example, a TFT LCD (Thin-Film-Transistor Liquid Crystal Display) or an OLED (Organic Light Emitting Diode) display, or other appropriate display technology. The display interface 1356 may comprise appropriate circuitry for driving the display 1354 to present graphical and other information to a user. The control interface 1358 may receive commands from a user and convert them for submission to the processor 1352. In addition, an external interface 1362 may be provided in communication with processor 1352, so as to enable near area communication of device 1350 with other devices. External interface 1362 may provide, for example, for wired communication in some implementations, or for wireless communication in other implementations, and multiple interfaces may also be used.

The memory 1364 stores information within the computing device 1350. The memory 1364 can be implemented as one or more of a computer-readable medium or media, a volatile memory unit or units, or a non-volatile memory unit or units. Expansion memory 1374 may also be provided and connected to device 1350 through expansion interface 1372, which may include, for example, a SIMM (Single In Line Memory Module) card interface. Such expansion memory 1374 may provide extra storage space for device 1350, or may also store applications or other information for device 1350. Specifically, expansion memory 1374 may include instructions to carry out or supplement the processes described above, and may include secure information also. Thus, for example, expansion memory 1374 may be provided as a security module for device 1350, and may be programmed with instructions that permit secure use of device 1350. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1364, expansion memory 1374, or memory on processor 1352 that may be received, for example, over transceiver 1368 or external interface 1362.

Device 1350 may communicate wirelessly through communication interface 1366, which may include digital signal processing circuitry where necessary. Communication interface 1366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1368. In addition, short-range communication may occur, such as using a Bluetooth, Wi-Fi, or other such transceiver (not shown). In addition, GPS (Global Positioning System) receiver module 1370 may provide additional navigation- and location-related wireless data to device 1350, which may be used as appropriate by applications running on device 1350.

Device 1350 may also communicate audibly using audio codec 1360, which may receive spoken information from a user and convert it to usable digital information. Audio codec 1360 may likewise generate audible sound for a user, such as through a speaker, e.g., in a handset of device 1350. Such sound may include sound from voice telephone calls, may include recorded sound (e.g., voice messages, music files, etc.) and may also include sound generated by applications operating on device 1350.

The computing device 1350 may be implemented in a number of different forms, as shown in the figure. For example, it may be implemented as a cellular telephone 1380. It may also be implemented as part of a smart phone 1382, personal digital assistant, or another similar mobile device.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent exemplary functional relationships and/or physical or logical couplings between the various elements. Many alternative or additional functional relationships, physical connections or logical connections may be present in a practical device. Moreover, no item or component is essential to the practice of the embodiments disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Although certain example methods, apparatuses and articles of manufacture have been described herein, the scope of coverage of this patent is not limited thereto. It is to be understood that terminology employed herein is for the purpose of describing particular aspects, and is not intended to be limiting. On the contrary, this patent covers all methods, apparatus and articles of manufacture fairly falling within the scope of the claims of this patent.

What is claimed is:

1. A method comprising:

receiving, by a first user device, an authentication credential of a user account associated with the first user device and a second user device;

receiving, by the first user device, session data about a computing session previously established on the second user device, the session data including information about a display arrangement of a plurality of applications launched by a user during the computing session on the second user device, the session data associating at least some of the plurality of applications with one or more workspaces, the one or more workspaces being different native operating system-managed environments for grouping application windows; and generating a local reconstruction of the computing session on the first user device using the session data, including:

initiating, by an operating system of the first user device, local execution of at least a portion of the plurality of applications on the first user device; and rendering, by the operating system of the first user device, windows of the portion of the plurality of applications on the first user device according to the display arrangement in which the windows were arranged during the computing session on the second user device, including configuring a display of the first user device to provide separate desktop interfaces for the one or more workspaces.

2. The method of claim 1, wherein the session data includes information indicating that a split screen mode was enabled during the computing session on the second user device, wherein generating the local reconstruction on the first user device includes:

partitioning the display of the first user device into a first display screen portion and a second display screen portion, the second display screen portion being independent from the first display screen portion;

rendering first windows of a first portion of the plurality of applications in the first display screen portion according to the display arrangement in which the first windows were arranged during the computing session on the second user device; and rendering second windows of a second portion of the plurality of applications in the second display screen portion according to the display arrangement in which the second windows were arranged during the computing session on the second user device.

3. The method of claim 1, wherein the one or more workspaces include a first workspace and a second workspace that were established during the computing session on the second user device, wherein generating the local reconstruction of the computing session on the first user device includes:

rendering, on the first user device, a first user interface element that represents the first workspace and a second user interface element that represents the second workspace;

in response to a user selection of the first user interface element, rendering a first workspace interface on the first user device, the first workspace interface arranging first windows of a first portion of the plurality of applications in the display arrangement in which the first windows were displayed in the first workspace on the second user device; and in response to a user selection of the second user interface element, rendering a second workspace interface on the first user device, the second workspace interface arranging second windows of a second portion of the plurality of applications in the display arrangement in which the second windows were displayed in the second workspace on the second user device.

4. The method of claim 1, wherein the first user device displays a current desktop interface, the method further comprising:

in response to receiving the session data, generating a workspace of the one or more workspaces that corresponds to the computing session established by the second user device;

rendering, on the first user device, a user interface element that represents the workspace; and in response to a user selection of the user interface element, switching the display of the first user device from the current desktop interface to a desktop interface corresponding to the workspace, the desktop interface displaying the windows of the portion of the plurality of applications on the first user device according to the display arrangement in which the windows were arranged during the computing session on the second user device.

5. The method of claim 1, wherein the session data includes coordinates of a window of an application, and a width and height of the window.

6. The method of claim 1, wherein the session data includes information indicating that a picture-in-picture window was enabled during the computing session on the second user device, wherein generating the local reconstruction of the computing session on the first user device includes:

replicating, by the operating system of the first user device, the picture-in-picture window on the first user device according to a display arrangement in which the picture-in-picture window was arranged during the computing session on the second user device, the picture-in-picture window configured to display media data in a foreground regardless of whether the user interacts with other applications on the first user device.

7. The method of claim 1, wherein the session data includes information indicating that a full screen mode for an application was enabled during the computing session on the second user device, wherein generating the local reconstruction of the computing session on the first user device includes:

displaying an interface of the application in the full screen mode in which a toolbar of the application is removed from the interface on the first user device.

8. The method of claim 1, further comprising:

in response to receiving the session data, rendering a user interface object with a selectable option to enable a user to initiate generation of the local reconstruction of the computing session on the first user device; and in response to a user selection of the selectable option, generating the local reconstruction of the computing session on the first user device.

9. The method of claim 1, wherein receiving the session data includes:

receiving, over a network, the session data from a synchronization engine executing on one or more server computers, the synchronization engine configured to manage synchronization of the computing session across user devices.

10. An apparatus comprising:

at least one processor; and a non-transitory computer-readable medium storing executable instructions that when executed by the at least one processor cause the at least one processor to:

receive, by a first user device, an authentication credential of a user account associated with the first user device and a second user device;

receive, by the first user device, session data about a computing session previously established on the second user device, the session data including information about a display arrangement of a plurality of applications launched by a user during the computing session on the second user device, the session data associating at least some of the plurality of applications with one or more workspaces, the one or more workspaces being different native operating system-managed environments for grouping application windows; and generate a local reconstruction of the computing session on the first user device using the session data, including:

initiate, by an operating system of the first user device, local execution of a portion of the plurality of applications on the first user device;

render, by the operating system of the first user device, windows of the portion of the plurality of applications on the first user device to the display arrangement in which the windows were arranged during the computing session on the second user device; and configure a display of the first user device to provide separate desktop interfaces for the one or more workspaces.

11. A non-transitory computer-readable medium storing executable instructions that cause at least one processor to execute operations, the operations comprising:

receiving, by a first user device, an authentication credential of a user account associated with the first user device and a second user device;

receiving, from the second user device, session data about a computing session previously established on the second user device, the session data including information about a display arrangement of a plurality of applications launched by a user during the computing session on the second user device, the session data associating at least some of the plurality of applications with one or more workspaces, the one or more workspaces being different native operating system-managed environments for grouping application windows; and generating a local reconstruction of the computing session on the first user device using the session data, including:

initiating, by an operating system of the first user device, local execution of at least a portion of the plurality of applications on the first user device; and rendering, by the operating system of the first user device, windows of the portion of the plurality of applications on the first user device according to the display arrangement in which the windows were arranged during the computing session on the second user device, including configuring a display of the first user device to provide separate desktop interfaces for the one or more workspaces.

12. The non-transitory computer-readable medium of claim 11, wherein the session data includes information indicating that a split screen mode was enabled during the computing session on the second user device, wherein the operations further comprise:

partitioning the display of the first user device into a first display screen portion and a second display screen portion, the second display screen portion being independent from the first display screen portion; and rendering the windows of the portion of the plurality of applications in the first display screen portion and the second display screen portion according to the display arrangement in which the windows were arranged during the computing session on the second user device.

13. The non-transitory computer-readable medium of claim 11, wherein the one or more workspaces include a first workspace and a second workspace that were established during the computing session on the second user device, wherein the operations further comprise:

rendering, on the first user device, a first user interface element that represents the first workspace and a second user interface element that represents the second workspace;

in response to a user selection of the first user interface element, rendering a first workspace interface on the first user device, the first workspace interface arranging first windows of a first portion of the plurality of applications in the display arrangement in which the first windows were displayed in the first workspace on the second user device; and in response to a user selection of the second user interface element, rendering a second workspace interface on the first user device, the second workspace interface arranging second windows of a second portion of the plurality of applications in the display arrangement in which the second windows were displayed in the second workspace on the second user device.

14. The non-transitory computer-readable medium of claim 11, wherein the first user device displays a current desktop interface, wherein the operations further comprise:

in response to receiving the session data, generating a workspace of the one or more workspaces that corresponds to the computing session established by the second user device;

rendering, on the first user device, a user interface element that represents the workspace; and in response to a user selection of the user interface element, switching the display of the first user device from the current desktop interface to the workspace, the workspace displaying the windows of the portion of the plurality of applications on the first user device according to the display arrangement in which the windows were arranged during the computing session on the second user device.

15. The method of claim 1, further comprising:

selecting a subset of the plurality of applications for the local reconstruction on the first user device based on a prediction that the subset is relevant to a usage context of the first user device.

16. The method of claim 1, wherein the portion of the plurality of applications includes a non-browser application, a browser application, a tab rendered by the browser application, and a web application executable by the browser application.

17. The apparatus of claim 10, wherein the session data includes stacking order information indicating whether a window of an application of the plurality of applications was positioned in a foreground or a background on the second user device, wherein the executable instructions include instructions that cause the at least one processor to:

in response to the stacking order information indicating that the window of the application was positioned in the background on the second user device, render the window of the application in the background on the first user device.

18. The apparatus of claim 10, wherein the portion of the plurality of applications include a first application and a second application, the session data includes focus information indicating that a window of the first application had focus when the computing session was last recorded, wherein the executable instructions include instructions that cause the at least one processor to:

identify the window of the first application as an active interface to receive user input.

19. The apparatus of claim 11, wherein the session data includes information reflecting a state of the computing session in response to the user logging out of the second user device.

20. The apparatus of claim 10, wherein the session data is stored in association with the user account and retrieved from a remote server upon authentication of the user account on the first user device.

21. The apparatus of claim 10, wherein the executable instructions include instructions that cause the at least one processor to:

render a user interface that enables the user to select one of a plurality of stored computing sessions associated with the user account for synchronization on the first user device.

22. The apparatus of claim 11, wherein the session data includes a position of a window of an application on a display of the second user device, the session data including a size of the window, wherein the executable instructions include instructions that cause the at least one processor to:

programmatically adjust at least one of the position of the window or the size of the window based on a display resolution or scaling factor associated with the first user device.

* * * * *